(12) United States Patent
Hauck

(10) Patent No.: US 7,308,517 B1
(45) Date of Patent: Dec. 11, 2007

(54) GAP COUNT ANALYSIS FOR A HIGH SPEED SERIALIZED BUS

(75) Inventor: Jerrold Von Hauck, Windermere, FL (US)

(73) Assignee: Apple Inc., Cupertino, CA (US)

( * ) Notice: Subject to any disclaimer, the term of this patent is extended or adjusted under 35 U.S.C. 154(b) by 195 days.

(21) Appl. No.: 10/749,791

(22) Filed: Dec. 29, 2003

(51) Int. Cl.
G06F 13/36 (2006.01)
H04L 12/28 (2006.01)

(52) U.S. Cl. .............. 710/118; 370/238; 370/516; 370/395.21; 370/252; 710/125; 710/305; 710/306; 713/401

(58) Field of Classification Search ............ 710/118, 710/125, 306, 305; 370/252, 238, 516, 395.21; 713/401
See application file for complete search history.

(56) References Cited

U.S. PATENT DOCUMENTS

| | | | |
|---|---|---|---|
| 4,156,789 A | 5/1979 | Doelz | 179/15 AL |
| 4,194,113 A | 3/1980 | Fulks et al. | 317/20 |
| 5,014,262 A | 5/1991 | Harshavardhana | 370/16 |
| 5,274,631 A | 12/1993 | Bhardwaj | 370/60 |
| 5,321,812 A | 6/1994 | Benedict et al. | 395/800 |
| 5,343,461 A | 8/1994 | Barton et al. | 370/13 |
| 5,394,556 A | 2/1995 | Oprescu | 395/800 |
| 5,406,643 A | 4/1995 | Burke et al. | 395/200 |
| 5,452,330 A | 9/1995 | Goldstein | 375/257 |
| 5,490,250 A | 2/1996 | Reschke et al. | 375/185.01 |
| 5,490,253 A | 2/1996 | Laha et al. | 395/304 |
| 5,493,568 A | 2/1996 | Sampat et al. | 370/60 |
| 5,495,481 A | 2/1996 | Duckwall | 370/85.2 |
| 5,524,254 A | 6/1996 | Morgan et al. | 395/800 |
| 5,539,390 A | 7/1996 | Nagano et al. | 340/825.07 |
| 5,541,670 A | 7/1996 | Hanai | 348/705 |
| 5,568,487 A | 10/1996 | Sitbon et al. | 370/94.1 |
| 5,568,641 A | 10/1996 | Nelson et al. | 395/700 |
| 5,583,922 A | 12/1996 | Davis et al. | 397/96 |
| 5,621,659 A | 4/1997 | Matsumoto et al. | 395/860 |
| 5,630,173 A | 5/1997 | Oprescu | 395/860 |
| 5,632,016 A | 5/1997 | Hoch et al. | 395/200.02 |
| 5,640,595 A | 6/1997 | Baugher et al. | 395/830 |
| 5,642,515 A | 6/1997 | Jones et al. | 395/727 |
| 5,654,657 A | 8/1997 | Pearce | 327/163 |
| 5,684,715 A | 11/1997 | Palmer | 364/514 |
| 5,687,319 A * | 11/1997 | Cook et al. | 370/256 |

(Continued)

OTHER PUBLICATIONS

Bregni et al., Jitter Testing Technique and Results VC-4 Desynchronizer Output of SDH Equipment, IEEE Transactions on Instrumentation and Measurement, vol. 44, Issue 3, pp. 675-678, Jun. 1995.

(Continued)

Primary Examiner—Paul R. Myers
Assistant Examiner—Brian Misiura
(74) Attorney, Agent, or Firm—Gazdzinski & Associates

(57) ABSTRACT

A method of optimizing communication over a high-speed serial bus by minimizing the delay between packets transmitted over the bus is disclosed. The method comprises: calculating the round trip delay between PHYs connected on the bus by pinging; a bus manager sending a configuration packet to all PHYs connected on the bus, the configuration packet containing a minimum gap_count parameter value; and all PHYs connected on the bus sending packets over the bus using the minimum gap_count parameter value as a delay between packets.

43 Claims, 3 Drawing Sheets

U.S. PATENT DOCUMENTS

| | | | |
|---|---|---|---|
| 5,701,476 A | 12/1997 | Fenger | 395/652 |
| 5,701,492 A | 12/1997 | Wadsworth et al. | 395/712 |
| 5,706,278 A | 1/1998 | Robillard et al. | 370/222 |
| 5,712,834 A | 1/1998 | Nagano et al. | 369/19 |
| 5,719,862 A | 2/1998 | Lee et al. | 370/355 |
| 5,754,756 A | 5/1998 | Danneels et al. | 395/200.1 |
| 5,764,930 A | 6/1998 | Staats | 395/287 |
| 5,784,648 A | 7/1998 | Duckwall | 395/860 |
| 5,802,048 A | 9/1998 | Duckwall | 370/389 |
| 5,802,057 A | 9/1998 | Duckwall et al. | 370/389 |
| 5,802,365 A | 9/1998 | Kathail et al. | 395/681 |
| 5,805,073 A | 9/1998 | Nagano et al. | 340/825.07 |
| 5,809,331 A | 9/1998 | Staats et al. | 395/830 |
| 5,826,027 A | 10/1998 | Pedersen et al. | 395/200.51 |
| 5,832,298 A | 11/1998 | Sanchez et al. | 395/828 |
| 5,835,761 A | 11/1998 | Ishii et al. | 395/653 |
| 5,845,152 A | 12/1998 | Anderson et al. | 395/872 |
| 5,867,730 A | 2/1999 | Leyda | 395/830 |
| 5,875,301 A | 2/1999 | Duckwall et al. | 395/200.51 |
| 5,923,663 A | 7/1999 | Bontemps et al. | 370/445 |
| 5,930,480 A | 7/1999 | Staats | 395/200.74 |
| 5,935,208 A | 8/1999 | Duckwall et al. | 709/221 |
| 5,938,764 A | 8/1999 | Klein | 713/1 |
| 5,940,600 A | 8/1999 | Staats et al. | 395/287 |
| 5,954,796 A | 9/1999 | McCarty et al. | 709/222 |
| 5,968,152 A | 10/1999 | Staats | 710/104 |
| 5,970,052 A | 10/1999 | Lo et al. | 370/241 |
| 5,987,605 A | 11/1999 | Hill et al. | 713/2 |
| 5,991,842 A | 11/1999 | Takayama | 710/105 |
| 6,009,480 A | 12/1999 | Pleso | 710/8 |
| 6,032,202 A | 2/2000 | Lea et al. | 710/8 |
| 6,032,261 A | 2/2000 | Hulyalkar | 713/400 |
| 6,038,234 A | 3/2000 | LaFollette et al. | 370/443 |
| 6,038,625 A | 3/2000 | Ogino et al. | 710/104 |
| 6,070,187 A | 5/2000 | Subramaniam et al. | 709/220 |
| 6,073,206 A | 6/2000 | Piwonka et al. | 711/102 |
| 6,091,726 A | 7/2000 | Crivellari et al. | 370/392 |
| 6,115,764 A | 9/2000 | Chisholm et al. | 710/100 |
| 6,122,248 A | 9/2000 | Murakoshi et al. | 370/216 |
| 6,131,129 A | 10/2000 | Ludtke et al. | 710/5 |
| 6,131,134 A | 10/2000 | Huang et al. | 710/103 |
| 6,131,163 A | 10/2000 | Wiegel | 713/210 |
| 6,133,938 A | 10/2000 | James | 348/8 |
| 6,138,196 A | 10/2000 | Takayama et al. | 710/105 |
| 6,141,702 A | 10/2000 | Ludtke et al. | 710/5 |
| 6,141,767 A | 10/2000 | Hu et al. | 714/1 |
| 6,145,018 A | 11/2000 | LaFollette et al. | 710/8 |
| 6,157,972 A | 12/2000 | Newman et al. | 710/100 |
| 6,160,796 A | 12/2000 | Zou | 370/257 |
| 6,167,532 A | 12/2000 | Wisecup | 714/23 |
| 6,173,327 B1 | 1/2001 | De Borst et al. | 709/231 |
| 6,192,189 B1 | 2/2001 | Fujinami et al. | 386/96 |
| 6,199,119 B1 | 3/2001 | Duckwall et al. | 710/8 |
| 6,202,210 B1 | 3/2001 | Ludtke | 725/20 |
| 6,212,171 B1 * | 4/2001 | LaFollette et al. | 370/257 |
| 6,212,633 B1 | 4/2001 | Levy et al. | 713/153 |
| 6,219,697 B1 | 4/2001 | Lawande et al. | 709/221 |
| 6,226,680 B1 | 5/2001 | Boucher et al. | 709/230 |
| 6,233,615 B1 | 5/2001 | Van Loo | 709/224 |
| 6,233,624 B1 | 5/2001 | Hyder et al. | 709/327 |
| 6,243,778 B1 | 6/2001 | Fung et al. | 710/113 |
| 6,243,783 B1 * | 6/2001 | Smyers et al. | 710/310 |
| 6,247,063 B1 | 6/2001 | Ichimi et al. | 709/250 |
| 6,247,083 B1 | 6/2001 | Hake et al. | 710/107 |
| 6,253,114 B1 | 6/2001 | Takihara | 700/83 |
| 6,253,255 B1 | 6/2001 | Hyder et al. | 709/321 |
| 6,256,059 B1 | 7/2001 | Fichtner | 348/207 |
| 6,260,063 B1 | 7/2001 | Ludtke et al. | 709/224 |
| 6,266,334 B1 | 7/2001 | Duckwall | 370/397 |
| 6,266,344 B1 | 7/2001 | Fujimori et al. | 370/468 |
| 6,266,701 B1 | 7/2001 | Sridhar et al. | 709/232 |
| 6,275,889 B1 | 8/2001 | Saito | 710/129 |
| 6,282,597 B1 | 8/2001 | Kawamura | 710/105 |
| 6,292,840 B1 | 9/2001 | Blomfield-Brown et al. | 709/247 |
| 6,292,479 B1 | 10/2001 | Shima et al. | 700/83 |
| 6,308,222 B1 | 10/2001 | Krueger et al. | 709/247 |
| 6,311,228 B1 | 10/2001 | Ray | 709/321 |
| 6,314,461 B2 | 11/2001 | Duckwall et al. | 709/221 |
| 6,343,321 B1 | 1/2002 | Patki et al. | 709/227 |
| 6,345,315 B1 | 2/2002 | Mishra | 709/329 |
| 6,347,362 B1 | 2/2002 | Schoinas et al. | 711/147 |
| 6,353,558 B1 | 3/2002 | Hauck et al. | 370/450 |
| 6,353,868 B1 | 3/2002 | Takayama et al. | 710/129 |
| 6,363,085 B1 | 3/2002 | Samuels | 370/502 |
| 6,373,821 B2 | 4/2002 | Staats | 370/252 |
| 6,385,679 B1 | 5/2002 | Duckwall et al. | 710/119 |
| 6,405,247 B1 | 6/2002 | Lawande et al. | 709/221 |
| 6,411,628 B1 | 6/2002 | Hauck et al. | 370/450 |
| 6,418,150 B1 | 7/2002 | Staats | 370/503 |
| 6,425,975 B1 | 7/2002 | Tateyama et al. | 710/11 |
| 6,426,962 B1 | 7/2002 | Cabezas et al. | 370/516 |
| 6,442,630 B1 | 8/2002 | Takayama et al. | 710/105 |
| 6,446,116 B1 | 9/2002 | Burridge | 709/214 |
| 6,446,142 B1 | 9/2002 | Shima et al. | 710/16 |
| 6,452,975 B1 | 9/2002 | Hannah | 375/257 |
| 6,457,086 B1 | 9/2002 | Duckwall | 710/305 |
| 6,466,982 B1 | 10/2002 | Ruberg | 709/227 |
| 6,496,862 B1 | 12/2002 | Akatsu et al. | 709/224 |
| 6,502,144 B1 | 12/2002 | Accarie | 710/8 |
| 6,513,085 B1 | 1/2003 | Gugel et al. | 710/305 |
| 6,519,657 B1 | 2/2003 | Stone et al. | 710/10 |
| 6,529,522 B1 | 3/2003 | Ito et al. | 370/466 |
| 6,574,588 B1 | 6/2003 | Shapiro et al. | 703/107 |
| 6,587,904 B1 | 7/2003 | Hauck et al. | 710/107 |
| 6,591,300 B1 | 7/2003 | Yurkovic | 709/226 |
| 6,606,320 B1 | 8/2003 | Nomura et al. | 370/395.1 |
| 6,618,750 B1 | 9/2003 | Staats | 709/209 |
| 6,618,785 B1 | 9/2003 | Whitby-Strevens | 710/305 |
| 6,621,832 B2 | 9/2003 | Staats | 370/503 |
| 6,628,607 B1 | 9/2003 | Hauck et al. | 370/216 |
| 6,631,426 B1 | 10/2003 | Staats | 710/9 |
| 6,636,914 B1 | 10/2003 | Teener | 710/240 |
| 6,639,918 B1 | 10/2003 | Hauck et al. | 370/462 |
| 6,643,714 B1 | 11/2003 | Chrysanthakopoulos | 710/8 |
| 6,671,768 B1 | 12/2003 | Brown | 711/102 |
| 6,686,838 B1 | 2/2004 | Rezvani et al. | 340/506 |
| 6,691,096 B1 | 2/2004 | Staats | 701/1 |
| 6,718,497 B1 | 4/2004 | Whitby-Strevens | 714/739 |
| 6,804,244 B1 * | 10/2004 | Anandakumar et al. | 370/395.21 |
| 6,909,699 B2 * | 6/2005 | Masunaga et al. | 370/252 |
| 7,145,887 B1 * | 12/2006 | Akgun et al. | 370/321 |
| 7,225,286 B2 * | 5/2007 | Bennett | 710/305 |
| 2001/0001151 A1 | 5/2001 | Duckwall et al. | 710/8 |
| 2001/0019561 A1 | 9/2001 | Staats | 370/487 |
| 2001/0024423 A1 | 9/2001 | Duckwall et al. | 370/254 |
| 2002/0057655 A1 | 5/2002 | Staats | 370/256 |
| 2002/0085581 A1 | 7/2002 | Hauck et al. | 370/442 |
| 2002/0101231 A1 | 8/2002 | Staats | 324/126 |
| 2002/0103947 A1 | 8/2002 | Duckwall et al. | 710/19 |
| 2002/0141418 A1 * | 10/2002 | Ben-Dor et al. | 370/398 |
| 2002/0172226 A1 | 11/2002 | Staats | 370/503 |
| 2002/0188780 A1 | 12/2002 | Duckwall | 710/105 |
| 2002/0188783 A1 | 12/2002 | Duckwall et al. | 710/119 |
| 2003/0037161 A1 | 2/2003 | Duckwall et al. | 709/233 |
| 2003/0055999 A1 | 3/2003 | Duckwall et al. | 709/236 |
| 2003/0236938 A1 * | 12/2003 | Bennett | 710/305 |
| 2004/0001458 A1 * | 1/2004 | Dorenbosch et al. | 370/329 |
| 2004/0037274 A1 * | 2/2004 | Osawa et al. | 370/362 |
| 2004/0165595 A1 * | 8/2004 | Holmgren et al. | 370/395.3 |
| 2004/0186731 A1 * | 9/2004 | Takahashi et al. | 704/277 |
| 2004/0218542 A1 * | 11/2004 | Lee | 370/248 |
| 2004/0258004 A1 * | 12/2004 | Brocke et al. | 370/254 |

2005/0081116 A1* 4/2005 Bejerano et al. .............. 714/47

OTHER PUBLICATIONS

"IEEE Standard for a High Performance Serial Bus", IEEE Standard 1394-1995, Institute of Electrical and Electronics Engineers, Inc., pp. I-384, approved Jul. 22, 1996.

Shiwen et al., Parellel Positive Justification in SDH C_4 Mapping, *IEEE International Conference on Communications*, vol. 3, pp. 1577-1581, Jun. 12, 1997.

"AV/C Digital Interface Command Set General Specification, Rev. 3.0", 1394 Trade Association, pp. 4-5, 20-34, Apr. 15, 1998.

"Information Technology-Fibre Channel-Methodologies for Jitter Specification", NCITS TR-25-1999, Jitter Working Group Technical Report, Rev. 10, pp. 1-96, Jun. 9, 1999.

"P1394a Draft Standard for a High Performance Serial Bus (Supplement)", Draft 3.0, Institute of Electrical and Electronics Engineers, Inc., pp. 1-187, Jun. 30, 1999.

"IEEE Standard for a High Performance Serial Bus-Amendment 1", Institute of Electrical and Electronics Engineers, Inc., pp. 1-196, approved Mar. 30, 2000.

P1394b IEEE Draft Standard for a High Performance Serial Bus (High Speed Supplement) P139b Draft 1.3.3, Institute of Electrical and Electronics Engineers, Inc., pp. 1-408, Nov. 16, 2001.

"IEEE Standard for a High Performance Serial Bus-Amendment 2", Institute of Electrical and Electronics Engineers, Inc., pp. 1-369, 2002, no month.

* cited by examiner

GAP COUNT ANALYSIS FOR A HIGH SPEED SERIALIZED BUS

FIELD OF THE INVENTION

The present invention relates broadly to serial bus performance. Specifically, the present invention relates to improving bus performance by calculating the optimal gap_count parameter for a given topology utilizing a high-speed serial bus to connect devices.

BACKGROUND OF THE INVENTION

The Institute of Electrical and Electronic Engineers (IEEE) has promulgated a number of versions of a high-speed serial bus protocol falling under the IEEE 1394 family of standards (referred to herein collectively as "1394"). A typical serial bus having a1394 architecture interconnects multiple node devices via point-to-point links, such as cables, each connecting a single node on the serial bus to another node on the serial bus. Data packets are propagated throughout the serial bus using a number of point-to-point transactions, such that a node that receives a packet from another node via a first point-to-point link retransmits the received packet via other point-to-point links. A tree network configuration and associated packet handling protocol ensures that each node receives every packet once. The 1394-compliant serial bus may be used as an alternate bus for the parallel backplane of a computer system, as a low cost peripheral bus, or as a bus bridge between architecturally compatible buses. Bus performance is gauged by throughput, or the amount of data that can be transmitted over the bus during a period of time.

There are several ways to improve bus performance. Devices connected to the bus can be arranged to minimize the longest round-trip delay between any two leaf nodes. This may involve either minimizing the number of cable connections between the farthest devices, reducing cable lengths, or both. Another way to improve bus performance is to group devices with identical speed capabilities next to one another. This avoids the creation of a "speed trap" when a slower device lies along the path between the two faster devices. Finally, bus performance can be improved by setting the PHY gap count parameter to the lowest workable value for a particular topology. However, determining this lowest workable value is problematic in that all of the variables affecting this value are unknown. Gap count parameters have been configured in the past using a subset of all possible variables, and the result is that the gap count is not optimal.

SUMMARY OF THE INVENTION

The present invention provides an optimal gap count that allows a high-speed serial bus to run faster and thus realize superior performance over prior buses. In an embodiment, bus management software sends a special PHY configuration packet that is recognized by all PHYs on the bus. The configuration packet contains a gap count value that all PHYs on the bus can use. As this gap count value decreases the time interval between packets that are transmitted, more real data can be transmitted over the bus per unit of time.

In an embodiment, the bus manager pings a PHY. The PHY sends a response to the ping, and a flight time value of the response from the PHY to the bus manager is added to calculate a round trip delay value. The ping command runs at the link layer level, from the link layer of one node to the link layer of another node. All flight time between link layer and PHY is ignored, and just the flight time from one PHY to another PHY is calculated. The ping time measured shows the link-to-link delay. The delay between the bus and the link is specified in the bus standard with minimum and maximum values. The PHY and link layer of a node is designed to be within that range specified by the standard. The round trip delay between nodes can be calculated as:

$$\text{Round\_Trip\_Delay}_{\max}^{[P_X OP_Y]} \leq$$

$$\begin{pmatrix} \text{Round\_Trip\_Delay}_{Ping,\max}^{[P_{BM} OP_X]} + \sum_{n}^{(BM,X)} 2 \cdot Jitter_n + \\ \text{Round\_Trip\_Delay}_{Ping,\max}^{[P_{BM} OP_Y]} + \sum_{n}^{(BM,Y)} 2 \cdot Jitter_n + \\ \text{PHY\_DELAY}_{N,\max}^{P'_N \to P_N} + \text{ARB\_RESPONSE\_DELAY}_{N,\max}^{P_N \to P'_N} \end{pmatrix} - $$

$$\begin{pmatrix} 2 \cdot \text{Round\_Trip\_Delay}_{Ping,\min}^{[P_{BM} OP_N]} + 4 \cdot Jitter_N + \\ \text{PHY\_DELAY}_{N,\min}^{P_N^{BM} \to P'_N} + \text{ARB\_RESPONSE\_DELAY}_{N,\min}^{P'_N \to P_N^{BM}} + \\ \text{PHY\_DELAY}_{N,\min}^{P_N^{BM} \to P_N} + \text{ARB\_RESPONSE\_DELAY}_{N,\min}^{P_N \to P_N^{BM}} \end{pmatrix}$$

This value can be communicated as the gap count parameter contained in the configuration packet, thus setting the gap between packets to an optimal value and increasing bus performance.

Many other features and advantages of the present application will become apparent from the following detailed description considered in conjunction with the accompanying drawings, in which:

DETAILED DESCRIPTION

Four well known limiting corner cases for gap count are examined in an effort to find the minimum allowable gap count for a given topology. Both the table method and pinging method of determining the optimal gap count are explored.

It is important to note that this analysis assumes that PHY_DELAY can never exceed the maximum published in the PHY register set. However, corner conditions have been identified in which it is theoretically possible to have PHY_DELAY temporarily exceed the maximum published delay when repeating minimally spaced packets. Although not a rigorous proof, this phenomena is ignored for this analysis on the basis that it is presumed to be statistically insignificant.

Figure 1:
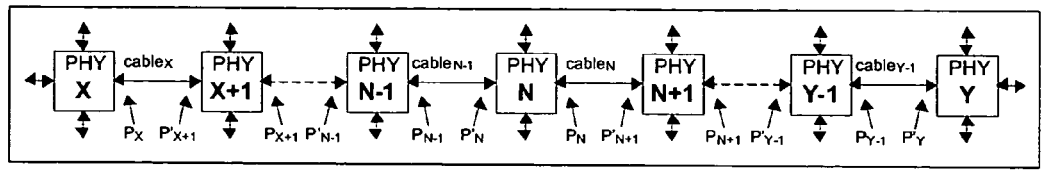
FIG. 1 illustrates an intervening path model between two nodes, X & Y, and denotes the reference points required for a full analysis.

The path between any two given PHYs can be represented as a daisy chain connection of the two devices with zero or more intervening, or repeating, PHYs. FIG. 1 illustrates such a path between two nodes, X & Y, and denotes the reference points required for a full analysis.

TABLE 1

| Variable Definitions | |
|---|---|
| ARB_RESPONSE_DELAY$_n^{P_n \rightarrow P'_n}$ | Delay in propagating arbitration indication received from port $P_n$ of PHY n to port $P'_n$ of PHY n. |
| BASERATE$_n$ | Fundamental operating frequency of PHY n. |
| cable_delay$_n$ | One-way flight time of arbitration and data signals through cable$_n$. The flight-time is assumed to be constant from one transmission to the next and symmetric. |
| DATA_END_TIME$_n^{P_n}$ | Length of DATA_END transmitted on port $P_n$ of PHY n. |
| PHY_DELAY$_n^{P_n \rightarrow P_n}$ | Time from receipt of first data bit at port $P'_n$ of PHY n to re-transmission of same bit at port $P_n$ of PHY n. |
| RESPONSE_TIME $P_n^{P_n}$ | Idle time at port $P'_n$ of PHY n between the reception of a inbound packet and the associated outbound arbitration indication for the subsequent packet intended to occur within the same isochronous interval or asynchronous subaction. |

Figure 2:
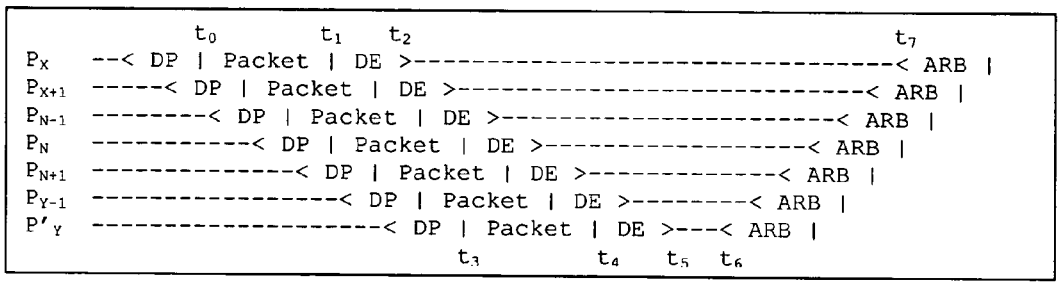
FIG. 2 illustrates ack/iso gap preservation, in the case where PHY X originated the most recent packet and PHY Y is responding (either with an ack or the next isochronous arbitration/packet).

For any given topology, the gap count must be set such that an iso or ack gap observed/generated at one PHY isn't falsely interpreted as a subaction gap by another PHY in the network. Ack/Iso gaps are known to be at their largest nearest the PHY that originated the last packet. To ensure that the most recent originating PHY doesn't interrupt a subaction or isochronous interval with asynchronous arbitration, its subaction_gap timeout must be greater than the largest IDLE which can legally occur within a subaction or isochronous interval. FIG. 2 illustrates the case in which PHY X originated the most recent packet and PHY Y is responding (either with an ack or the next isochronous arbitration/packet).

For all topologies, the idle time observed at point Px must not exceed the subaction gap detection time:

$$Idle_{max}^{P_X} < subaction\_gap_{min}^{P_X} \qquad (1)$$

The idle time at point Px can be determined by examining the sequence of time events in the network. All timing events are referenced to the external bus (as opposed to some internal point in the PHY).

| | |
|---|---|
| $t_0$ | First bit of packet sent at point $P_X$ |
| $t_1$ | Last bit of packet sent at point $P_x$, DATA_END begins. $t_1$ follows $t_0$ by the length of the packet timed in PHY X's clock domain. |
| $t_2$ | DATA_END concludes at point $P_X$, IDLE begins. $t_2$ follows $t_1$ by DATA_END_TIME$_X^{Px}$ |
| $t_3$ | First bit of packet received at point $P'_Y$. $t_3$ follows $t_0$ by all intervening cable_delay and PHY_DELAY instances. |
| $t_4$ | Last bit of packet received at point $P'_Y$. $t_4$ follows $t_3$ by the length of the packet timed in PHY Y-1's clock domain. |
| $t_5$ | DATA_END concludes at point $P'_Y$, gap begins. $t_5$ follows $t_4$ by DATA_END_TIME$_{Y-1}^{P_{Y-1}}$ |
| $t_6$ | PHY Y responds with ack packet, isoch packet, or isoch arbitration within RESPONSE_TIME$_Y^{P_Y}$ following $t_5$ |
| $t_7$ | Arbitration indication arrives at point $P_X$. $t_7$ follows $t_6$ by the all intervening cable_delay and ARB_RESPONSE_DELAY instances. |

$$t_1 = t_0 + \frac{packet\_length}{packet\_speed \cdot BASERATE_X} \qquad (2)$$

$$t_2 = t_1 + DATA\_END\_TIME_X^{P_X} = \qquad (3)$$
$$t_0 + \frac{packet\_length}{packet\_speed \cdot BASERATE_X} + DATA\_END\_TIME_X^{P_X}$$

$$t_3 = \qquad (4)$$
$$t_0 + cable\_delay_X + \sum_{n=X+1}^{Y-1}(cable\_delay_n + PHY\_DELAY_n^{P'_n \rightarrow P_n})$$

$$t_4 = t_3 + \frac{packet\_length}{packet\_speed \cdot BASERATE_{Y-1}} = t_0 + cable\_delay_X + \qquad (5)$$
$$\sum_{n=X+1}^{Y-1}(cable\_delay_n + PHY\_DELAY_n^{P'_n \rightarrow P_n}) +$$
$$\frac{packet\_lenght}{packet\_speed \cdot BASERATE_{Y-1}}$$

$$t_5 = t_4 + DATA\_END\_TIME_{Y-1}^{P_{y-1}} = t_0 + cable\_delay_X + \qquad (6)$$
$$\sum_{n=X+1}^{Y-1}(cable\_delay_n + PHY\_DELAY_n^{P'_n \rightarrow P_n}) +$$
$$\frac{packet\_length}{packet\_speed \cdot BASERATE_{Y-1}} + DATA\_END\_TIME_{Y-1}^{P_{y-1}}$$

$$t_6 = t_5 + RESPONSE\_TIME_Y^{P'_Y} = t_0 + cable\_delay_X + \qquad (7)$$
$$\sum_{n=X+1}^{Y-1}(cable\_delay_n + PHY\_DELAY_n^{P'_n \rightarrow P_n}) +$$
$$\frac{packet\_length}{packet\_speed \cdot BASERATE_{Y-1}} +$$
$$DATA\_END\_TIME_{Y-1}^{P_{y-1}} + RESPONSE\_TIME_Y^{P'_Y}$$

$$t_7 = t_6 + \sum_{n=X+1}^{Y-1}(cable\_delay_n + ARB\_RESPONSE\_DELAY_n^{P'_n \rightarrow P_n}) + \qquad (8)$$
$$cable\_delay_X = t_0 \sum_{n=X+1}^{Y-1}(2 \cdot cable\_delay_n + PHY\_DELAY_n^{P'_n \rightarrow P_n} +$$
$$ARB\_RESPONSE\_DELAY_n^{P'_n \rightarrow P_n}) +$$
$$2 \cdot cable\_delay_X + \frac{packet\_length}{packet\_speed \cdot BASERATE_{Y-1}} +$$
$$DATA\_END\_TIME_{Y-1}^{P_{y-1}} + RESPONSE\_TIME_Y^{P'_Y}$$

Given $t_0$ through $t_7$ above, the Idle time seen at point $P_x$ is given as:

$$Idle^{P_x} = t_7 - t_2 = \sum_{n=X+1}^{Y-1} \left(2 \cdot cable\_delay_n + PHY\_DELAY_n^{P'_n \to P_n} + ARB\_RESPONSE\_DELAY_n^{P_n \to P'_n}\right) + \qquad (9)$$

$$2 \cdot cable\_delay_X + RESPONSE\_TIME_Y^{P'_Y} +$$

$$DATA\_END\_TIME_{Y-1}^{P_{y-1}} - DATA\_END\_TIME_X^{P_x} +$$

$$\frac{packet\_length}{packet\_speed} \cdot \left(\frac{1}{BASERATE_{Y-1}} - \frac{1}{BASERATE_X}\right)$$

Let:

$$DE\_delta^{[P_{y-1}, P_x]} = \qquad (10)$$

$$DATA\_END\_TIME_{Y-1}^{P_{y-1}} - DATA\_END\_TIME_X^{P_x}$$

$$PPM\_delta^{[Y-1, X]} = \qquad (11)$$

$$\frac{packet\_length}{packet\_speed} \cdot \left(\frac{1}{BASERATE_{Y-1}} - \frac{1}{BASERATE_X}\right)$$

$$Round\_Trip\_Delay^{[P_X OP_Y]} = \qquad (12)$$

$$\sum_{n=X+1}^{Y-1} \left(2 \cdot cable\_delay_n + PHY\_DELAY_n^{P'_n \to P_n} + ARB\_RESPONSE\_DELAY_n^{P_n \to P'_n}\right) 2 \cdot cable\_delay_X$$

Then, $$Idle^{P_x} = Round\_Trip\_Delay^{[P_X OP_Y]} + \qquad (13)$$
$$RESPONSE\_TIME_Y^{P'_Y} + DE\_delta^{[P_{y-1}, P_x]} + PPM\_delta^{[Y-1, X]}$$

Substituting into Equation (1), Ack and Iso gaps are preserved network-wide if and only if:

$$\begin{bmatrix} Round\_Trip\_Delay^{[P_X OP_Y]} + RESPONSE\_TIME_Y^{P'_Y} + \\ DE\_delta^{[P_{y-1}, P_x]} + PPM\_delta^{[Y-1, X]} \end{bmatrix}_{max} < \qquad (14)$$

$$subaction\_gap_{min}^{P_x}$$

The minimum subaction_gap at point $P_x$ isn't well known. IEEE1394-1995, in Table 4-33, defines the minimum subaction_gap timeout used at a PHY's internal state machines, not at the external interface. It has been argued that the internal and external representations of time may differ by as much as ARB_RESPONSE_DELAY when a PHY is counting elapsed time between an internally generated event and an externally received event. However, the ARB_RESPONSE_DELAY value for a particular PHY isn't generally known externally. Fortunately, the ARB_RESPONSE_DELAY value for a PHY whose FIFO is known to be empty is bounded by the worst case PHY_DELAY reported within the PHY register map. This suggests a realistic bound for the minimum subaction_gap referenced at point $P_x$:

$$subaction\_gap_{min}^{P_X} \geq subaction\_gap_{min}^{i_x} - PHY\_DELAY_{X,max}^{P_x} \qquad (15)$$

where $$subaction\_gap_{min}^{i_x} = \frac{27 + gap\_count \cdot 16}{BASERATE_{X,max}} \qquad (16)$$

Combing Equations (14), (15), and (16):

$$\begin{bmatrix} Round\_Trip\_Delay^{[P_X OP_Y]} + \\ RESPONSE\_TIME_Y^{P'_Y} + \\ DE\_delta^{[P_{y-1}, P_x]} + \\ PPM\_delta^{[Y-1, X]} \end{bmatrix}_{max} < \left[\frac{27 + gap\_count \cdot 16}{BASERATE_{X,max}} - PHY\_DELAY_{X,max}^{P_x}\right] \qquad (17)$$

Solving for gap_count:

$$gap\_count > \qquad (18)$$

$$\frac{BASERATE_{X,max} \cdot \begin{bmatrix} Round\_Trip\_Delay_{max}^{[P_X OP_Y]} + \\ \begin{bmatrix} RESPONSE\_TIME_Y^{P'_Y} + \\ DE\_delta^{[P_{y-1}, P_x]} + \\ PPM\_delta^{[Y-1, X]} \end{bmatrix}_{max} + \\ PHY\_DELAY_{X,max}^{P_x} \end{bmatrix} - 27}{16}$$

Since RESPONSE_TIME, DE_delta, and PPM_delta are not independent parameters, the maximum of their sum is not accurately represented by the sum of their maximas. Finding a more accurate maximum for the combined quantity requires the identification of components of RESPONSE_TIME.

Figure 3:
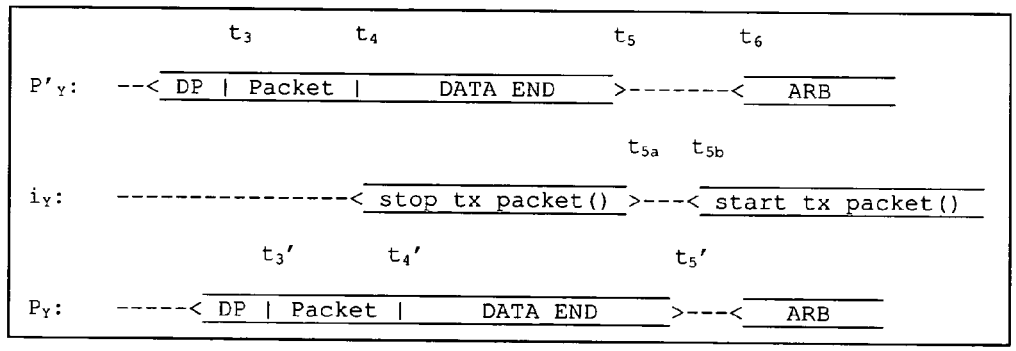
FIG. 3 illustrates the sequence PHY Y will follow in responding to a received packet.

As specified in p1394a, RESPONSE_TIME includes the time a responding node takes to repeat the received packet and then drive a subsequent arbitration indication. (Note that by examination of the C code, RESPONSE_TIME is defined to include the time it takes to repeat a packet even if the PHY in question is a leaf node.) FIG. 3 illustrates the sequence PHY Y will follow in responding to a received packet. $i_Y$ denotes the timings as seen/interpreted by the PHY state machine. Note that $P_Y$ can be any repeating port on PHY Y. Consequently, the timing constraints referenced to $P_Y$ in the following analysis must hold worst case for any and all repeating ports.

Beginning with the first arrival of data at $P'_Y$ ($t_3$), the elaborated timing sequence for RESPONSE_TIME is:

$t_3$    First bit of packet received at point $P'_Y$
$t_3'$    First bit of packet repeated at point $P_Y$. $t_3'$ lags $t_3$ by PHY_DELAY
$t_4$    Last bit of packet received at point $P'_Y$. $t_4$ follows $t_3$ by the length of the packet timed in PHY N's clock domain. DATA_END begins
$t_4'$    Last bit of packet repeated at point $P_Y$. $t_4'$ lags $t_3'$ by the length of the packet timed in PHY Y's clock domain. The PHY begins "repeating" DATA_END
$t_5$    DATA_END concludes at point $P'_Y$. $t_5$ follows $t_4$ by DATA_END_TIME$_{Y-1}^{P_{Y-1}}$ -continued $t_{5a}$ stop_tx_packet( ) concludes at point $i_Y$ and the state machines command the PHY ports to stop repeating DATA_END. $t_{5a}$ leads $t_5'$ by any transceiver delay.

$t_5'$ DATA_END concludes at point $P_Y$. $t_5'$ follows $t_4'$ by DATA_END_TIME$_Y^{P_Y}$.

$t_{5b}$ start_tx_packet( ) commences at point $i_Y$ and the state machines command the PHY ports to begin driving the first arbitration indication of any response. $t_{5b}$ lags $t_{5a}$ by an IDLE_GAP and an unspecified state machine delay herein called SM_DELAY.

$t_6$ PHY Y drives arbitration at points $P'_Y$. $t_6$ follows $t_{5b}$ by any transceiver delay.

$$t_{3'} = t_3 + \text{PHY\_DELAY}_Y^{P'_Y \to P_Y} \tag{19}$$

$$t_{4'} = t_{3'} + \frac{\text{packet\_length}}{\text{packet\_speed} \cdot \text{BASERATE}_Y} = \tag{20}$$

$$t_3 + \text{PHY\_DELAY}_Y^{P'_Y \to P_Y} + \frac{\text{packet\_length}}{\text{packet\_speed} \cdot \text{BASERATE}_Y}$$

$$t_{5'} = t_{4'} + \text{DATA\_END\_TIME}_Y^{P_Y} = t_3 + \text{PHY\_DELAY}_Y^{P'_Y \to P_Y} + \tag{21}$$

$$\frac{\text{packet\_length}}{\text{packet\_speed} \cdot \text{BASERATE}_Y} + \text{DATA\_END\_TIME}_Y^{P_Y}$$

$$t_{5a} = t_{5'} - \text{transceiver\_delay}_Y^{P_Y} = \tag{22}$$

$$t_3 + \text{PHY\_DELAY}_Y^{P'_Y \to P_Y} + \frac{\text{packet\_length}}{\text{packet\_speed} \cdot \text{BASERATE}_Y} + \text{DATA\_END\_TIME}_Y^{P_Y} - \text{transceiver\_delay}_Y^{P_Y}$$

$$t_{5b} = \tag{23}$$
$$t_{5a} + \text{IDLE\_GAP}_Y + \text{SM\_DELAY}_Y = t_3 + \text{PHY\_DELAY}_Y^{P'_Y \to P_Y} + \frac{\text{packet\_length}}{\text{packet\_speed} \cdot \text{BASERATE}_Y} + \text{DATA\_END\_TIME}_Y^{P_Y} + \text{IDLE\_GAP}_Y + \text{SM\_DELAY}_Y - \text{transceiver\_delay}_Y^{P_Y}$$

$$t_6 = t_{5b} + \text{transceiver\_delay}_Y^{P_Y} = \tag{24}$$
$$t_3 + \text{PHY\_DELAY}_Y^{P'_Y \to P_Y} + \frac{\text{packet\_length}}{\text{packet\_speed} \cdot \text{BASERATE}_Y} + \text{DATA\_END\_TIME}_Y^{P_Y} + \text{IDLE\_GAP}_Y + \text{SM\_DELAY}_Y + \text{transceiver\_delay}_Y^{P_Y} - \text{transceiver\_delay}_Y^{P_Y}$$

By definition, $$\text{RESPONSE\_TIME}_Y^{P'_Y} = t_6 - t_5 \tag{25}$$

and through substitution:

$$\text{RESPONSE\_TIME}_Y^{P'_Y} = \text{PHY\_DELAY}_Y^{P'_Y \to P_Y} + \tag{26}$$
$$\text{DE\_delta}^{[P_y, P_{y-1}]} + \text{PPM\_delta}^{[Y,Y]} + \text{IDLE\_GAP}_Y + \text{SM\_DELAY}_Y + \text{transceiver\_delay}_Y^{P_Y} - \text{transceiver\_delay}_Y^{P_Y}$$

As such, the combination of RESPONSE_TIME, DE_delta, and PPM_delta from equation (18) can be represented as:

$$\begin{bmatrix} \text{RESPONSE\_TIME}_Y^{P'_Y} + \\ \text{DE\_delta}^{[P_{y-1}, P_X]} + \\ \text{PPM\_delta}^{[Y-1, X]} \end{bmatrix} = \tag{27}$$

$$\begin{bmatrix} \text{PHY\_DELAY}_Y^{P'_Y \to P_Y} + \\ \text{DE\_delta}^{[P_y, P_{y-1}]} + \text{PPM\_delta}^{[Y,Y-1]} + \\ \text{IDLE\_GAP}_Y + \text{SM\_DELAY}_Y + \\ \text{transceiver\_delay}_Y^{P_Y} - \text{transceiver\_delay}_Y^{P_Y} + \\ \text{DE\_delta}^{[P_{y-1}, P_X]} + \text{PPM\_delta}^{[Y-1, X]} \end{bmatrix} =$$

$$\begin{bmatrix} \text{PHY\_DELAY}_Y^{P'_Y \to P_Y} + \\ \text{DE\_delta}^{[P_y, P_X]} + \text{PPM\_delta}^{[Y,X]} + \\ \text{IDLE\_GAP}_Y + \text{SM\_DELAY}_Y + \\ \text{transceiver\_delay}_Y^{P_Y} - \text{transceiver\_delay}_Y^{P_Y} \end{bmatrix}$$

Noting that if PHYs X and Y−1 both adhere to the same minimum timing requirement for DATA_END_TIME and maximum timing requirement for BASE_RATE, then $$\text{DE\_delta}_{\max}^{[P_Y, P_X]} = \text{DE\_delta}^{[P_Y, P_{Y-1}]} \tag{28}$$
$$\text{PPM\_delta}_{\max}^{[Y,X]} = \text{PPM\_delta}_{\max}^{[Y,Y-1]}$$

The combined maximum can be rewritten as:

$$\begin{bmatrix} \text{RESPONSE\_TIME}_Y^{P'_Y} + \\ \text{DE\_delta}^{[P_{Y-1}, P_X]} + \\ \text{PPM\_delta}^{[Y-1, X]} \end{bmatrix}_{\max} = \tag{29}$$

$$\begin{bmatrix} \text{PHY\_DELAY}_{Y,\max}^{P'_Y \to P_Y} + \\ \text{DE\_delta}_{\max}^{[P_Y, P_{Y-1}]} + \text{PPM\_delta}^{[Y,Y-1]} + \\ \text{IDLE\_GAP}_{Y,\max} + \text{SM\_DELAY}_{Y,\max} + \\ \text{transceiver\_delay}_{Y,\max}^{P_Y} - \text{transceiver\_delay}_{Y,\min}^{P_Y} \end{bmatrix}$$

Comparing to equation (26) allows $$\begin{bmatrix} \text{RESPONSE\_TIME}_Y^{P'_Y} + \\ \text{DE\_delta}^{[P_{Y-1}, P_X]} + \\ \text{PPM\_delta}^{[Y-1, X]} \end{bmatrix}_{\max} = \text{RESPONSE\_TIME}_{Y,\max}^{P'_Y} \tag{30}$$

Finally:

$$\text{gap\_count} > \frac{\text{BASERATE}_{X,\max} \cdot \begin{bmatrix} \text{Round\_Trip\_Delay}_{\max}^{[P_X OP_Y]} + \\ \text{RESPONSE\_TIME}_{Y,\max}^{P'_Y} + \\ \text{PHY\_DELAY}_{X,\max}^{P_X} \end{bmatrix} - 27}{16} \tag{31}$$

Figure 4:
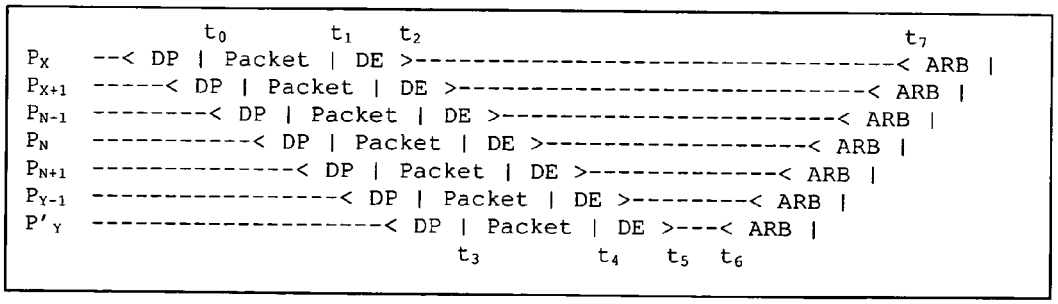
FIG. 4 illustrates subaction gap preservation, in the case where PHY X originated the most recent packet and PHY Y is responding after a subaction gap with arbitration for the current fairness interval.

For any given topology, the gap count must be set such that subaction gaps observed/generated at one PHY aren't falsely interpreted as arb_reset gaps by another PHY in the network. Subaction gaps are known to be at their largest nearest the PHY that originated the last packet. To ensure that the most recent originating PHY doesn't begin a new fairness interval before all PHYs exit the current one, its arb_reset_gap timeout must be greater than the largest subaction_gap which can legally occur. FIG. 4 illustrates the case in which PHY X originated the most recent packet and PHY Y is responding after a subaction gap with arbitration for the current fairness interval.

For all topologies, the idle time observed at point $P_x$ must not exceed the arbitration reset gap detection time:

$$Idle_{max}^{P_X} < \text{arb\_reset\_gap}_{min}^{P_X} \quad (32)$$

The analysis is identical to the case in which Ack and Iso gaps are preserved with the exception that PHY Y takes longer to respond to the trailing edge of DATA_END. Let PHY Y have a response time of subaction_response_time. Then, $$Idle^{P_X} = \text{Round\_Trip\_Delay}^{[P_X OP_Y]} + \text{subaction\_response\_time}_Y^{P_Y'} + \quad (33)$$
$$\text{DE\_delta}^{[P_{Y-1}, P_X]} + \text{PPM\_delta}^{[Y-1, X]}$$

Substituting into Equation (32), subaction gaps are preserved network-wide if and only if:

$$\begin{bmatrix} \text{Round\_Trip\_Delay}^{[P_X OP_Y]} + \\ \text{subaction\_response\_time}_Y^{P_Y'} + \\ \text{DE\_delta}^{[P_{Y-1}, P_X]} + \text{PPM\_delta}^{[Y-1, X]} \end{bmatrix}_{max} < \text{arb\_reset\_gap}_{min}^{P_X} \quad (34)$$

The minimum arb_reset_gap at point $P_x$ isn't well known. IEEE1394-1995, in Table 4-33, defines the minimum arb_reset_gap timeout used at a PHY's internal state machines, not at the external interface. It has been argued that the internal and external representations of time may differ by as much as ARB_RESPONSE_DELAY when a PHY is counting elapsed time between an internally generated event and an externally received event. However, the ARB_RESPONSE_DELAY value for a particular PHY isn't generally known externally. Fortunately, the ARB_RESPONSE_DELAY value for a PHY whose FIFO is known to be empty is bounded by the worst case PHY_DELAY reported within the PHY register map. This suggests a realistic bound for the minimum subaction_gap referenced at point $P_x$:

$$\text{arb\_reset\_gap}_{min}^{P_X} \geq \text{arb\_reset\_gap}_{min}^{i_X} - \text{PHY\_DELAY}_{X,max}^{P_X} \quad (35)$$

where $$\text{arb\_reset\_gap}_{min}^{i_X} = \frac{51 + \text{gap\_count} \cdot 32}{BASERATE_{X,max}} \quad (36)$$

The maximum subaction_response_time for PHY Y parallels the earlier dissection of RESPONSE_TIME. The timing sequence for subaction_response_time is identical to that of RESPONSE_TIME except that PHY Y, after concluding stop_tx_Packet( ), must wait to detect a subaction gap and then wait an additional arb_delay before calling start_tx_packet( ). Said differently, the idle period timed internally is a subaction gap plus arb_delay rather than an IDLE_GAP. Consequently, $t_{5b}$ becomes:

$$t_{5b} = t_{5a} + \text{subaction\_gap}^{ir} + \text{arb\_delay}^{ir} + SM\_DELAY_Y \quad (37)$$

and $$\text{subaction\_response\_time}_Y^{P_Y'} = \text{RESPONSE\_TIME}_Y^{P_Y'} - \quad (38)$$
$$\text{IDLE\_GAP}_Y + \text{subaction\_gap}^{j_Y} + \text{arb\_delay}^{j_Y}$$

Substituting into Equation (34), $$\begin{bmatrix} \text{Round\_Trip\_Delay}^{[P_X OP_Y]} + \text{RESPONSE\_TIME}_Y^{P_Y'} + \\ \text{DE\_delta}^{[P_{Y-1}, P_X]} + \text{PPM\_delta}^{[Y-1, X]} + \\ \text{subaction\_gap}^{j_Y} + \text{arb\_delay}^{j_Y} - \text{IDLE\_GAP}_Y \end{bmatrix}_{max} < \quad (39)$$
$$\text{arb\_reset\_gap}_{min}^{P_X}$$

Again, RESPONSE_TIME, DE_delta, and PPM_delta are not independent parameters. As shown previously, if PHYs X and Y−1 adhere to the same timing constant limits, the explicit DE_Delta and PPM_delta terms can be subsumed within RESPONSE_TIME giving:

$$\begin{bmatrix} \text{Round\_Trip\_Delay}_{max}^{[P_X OP_Y]} + \text{RESPONSE\_TIME}_{Y,max}^{P_Y'} + \\ \text{subaction\_gap}_{max}^{j_Y} + \text{arb\_delay}_{max}^{j_Y} - \text{MIN\_IDLE\_TIME}_Y \end{bmatrix} < \quad (40)$$
$$\text{arb\_reset\_gap}_{min}^{P_X}$$

where $$\text{subaction\_gap}_{max}^{j_Y} = \frac{29 + \text{gap\_count} \cdot 16}{BASERATE_{Y,min}} \quad (41)$$

$$\text{arb\_delay}_{max}^{j_Y} = \frac{\text{gap\_count} \cdot 4}{BASERATE_{Y,min}} \quad (42)$$

and $$\text{IDLE\_GAP}_{Y,min} = \text{MIN\_IDLE\_TIME}_Y \quad (43)$$

Combining Equations (35), (36), (40), (41), and (42):

$$\begin{bmatrix} \text{Round\_Trip\_Delay}_{max}^{[P_X OP_Y]} + \\ \text{RESPONSE\_TIME}_{Y,max}^{P_Y'} - \\ \text{MIN\_IDLE\_TIME}_Y + \\ \frac{29 + \text{gap\_count} \cdot 20}{BASERATE_{Y,min}} \end{bmatrix} < \begin{bmatrix} \frac{51 + \text{gap\_count} \cdot 32}{BASERATE_{X,max}} - \\ \text{PHY\_DELAY}_{X,max}^{P_X} \end{bmatrix} \quad (44)$$

Solving for gap_count:

$$\text{gap\_count} > \frac{BASERATE_{X,\max} \cdot \begin{bmatrix} \text{Round\_Trip\_Delay}_{\max}^{[P_X OP_Y]} + \\ \text{RESPONSE\_TIME}_{Y,\max}^{P'_Y} - \\ \text{MIN\_IDLE\_TIME}_y + \\ \text{PHY\_DELAY}_{X,\max}^{P_X} \end{bmatrix} +}{32 - 20 \cdot \frac{BASERATE_{X,\max}}{BASERATE_{Y,\min}}} \quad (45)$$

Figure 5:
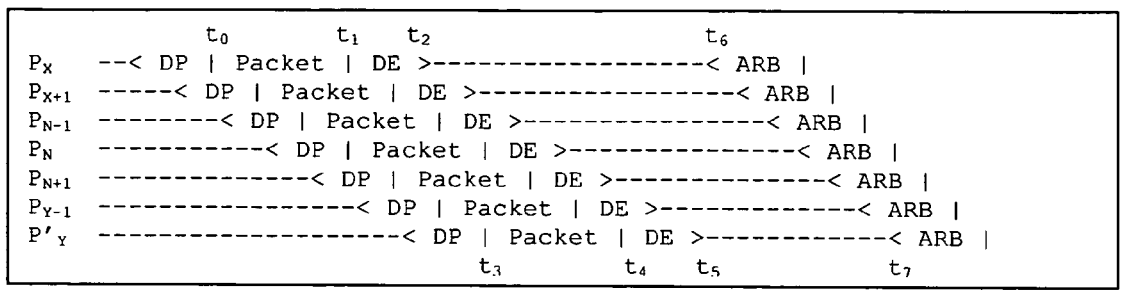
FIG. 5 illustrates consistent subaction gap detection, in the case where PHY X originates an isochronous packet, observes a subaction_gap, and begins to drive an arbitration indication.

For any given topology, the gap count must be set such that if a subaction gap is observed following an isochronous packet at one PHY, it is observed at all PHYs. The danger occurs when a subsequent arbitration indication is transmitted in the same direction as the previous data packet. Given that arbitration indications may propagate through intervening PHYs faster than data bits, gaps may be shortened as they are repeated. FIG. 5 illustrates the case in which PHY X originates an isochronous packet, observes a subaction_gap, and begins to drive an arbitration indication.

For all topologies, the minimum idle time observed at point $P'_Y$ must always exceed the maximum subaction gap detection time:

$$Idle_{\min}^{P'_Y} > \text{subaction\_gap}_{\max}^{P'_Y} \quad (46)$$

The time events $t_0$ through $t_5$ are identical to the previous analyses. In this scenario, $t_6$ follows $t_2$ by the time it takes PHY X to time subaction_gap and arb_delay:

$$t_6 = t_2 + \text{subaction\_gap}^{P_X} + \text{arb\_delay}^{P_X} \quad (47)$$

$$= t_0 + \frac{\text{packet\_length}}{\text{packet\_speed} \cdot BASERATE_X} + \text{DATA\_END\_TIME}_X^{P_X} +$$

$$\text{subaction\_gap}^{P_X} + \text{arb\_delay}^{P_X}$$

The 1995 specification provides the timeouts used internally by the state machine. The externally observed timing requirements could differ (given possible mismatches in transceiver delay and state machines between the leading edge of IDLE and the leading edge of the subsequent arbitration indication). However, previous works have suggested any such delays could and should be well matched and that the external timing would follow the internal timing exactly. Consequently, $$\text{subaction\_gap}^{P_X} + \text{arb\_delay}^{P_X} = \text{subaction\_gap}^{i_X} + \text{arb\_delay}^{i_X} \quad (48)$$

T7 follows T6 by the time it takes the arbitration signal to propagate through the intervening PHYs and cables:

$$t_7 = t_6 + \sum_{n=X+1}^{Y-1} \left( \text{cable\_delay}_n + \text{ARB\_RESPONSE\_DELAY}_n^{P'_n \to P_n} \right) + \quad (49)$$

$$\text{cable\_delay}_X$$

$$= t_0 + \frac{\text{packet\_length}}{\text{packet\_speed} \cdot BASERATE_X} + \text{DATA\_END\_TIME}_X^{P_X} +$$

$$\text{subtract\_gap}^{i_X} + \text{arb\_delay}^{i_X} +$$

$$\sum_{n=X+1}^{Y-1} \left( \text{cable\_delay}_n + \text{ARB\_RESPONSE\_DELAY}_n^{P'_n \to P_n} \right) +$$

$$\text{cable\_delay}_X$$

Given $t_0$ through $t_7$ above, the Idle time seen at point $P'_Y$ is given as:

$$Idle^{P'_Y} = t_7 - t_5 = \quad (50)$$

$$\text{subaction\_gap}^{i_X} + \text{arb\_delay}^{i_X} - \sum_{n=X+1}^{Y-1} \left( \text{PHY\_DELAY}_n^{P'_n \to P_n} - \text{ARB\_RESPONSE\_DELAY}_n^{P'_n \to P_n} \right) -$$

$$\text{DE\_delta}^{[P_{Y-1}, P_X]} - \text{PPM\_delta}^{[Y-1, X]}$$

Let $$\text{Data\_Arb\_Mismatch}^{[P_X \to R_Y]} = \quad (51)$$

$$\sum_{n=X+1}^{Y-1} \left( \text{PHY\_DELAY}_n^{P'_n \to P_n} - \text{ARB\_RESPONSE\_DELAY}_n^{P'_n \to P_n} \right)$$

Then, $$Idle^{P'_Y} = t_7 - t_5 = \quad (52)$$

$$\text{subaction\_gap}^{i_X} + \text{arb\_delay}^{i_X} - \text{Data\_Arb\_Mismatch}^{[P_X \to R_Y]} -$$

$$\text{DE\_delta}^{[P_{Y-1}, P_X]} - \text{PPM\_delta}^{[Y-1, X]}$$

Figure 6:
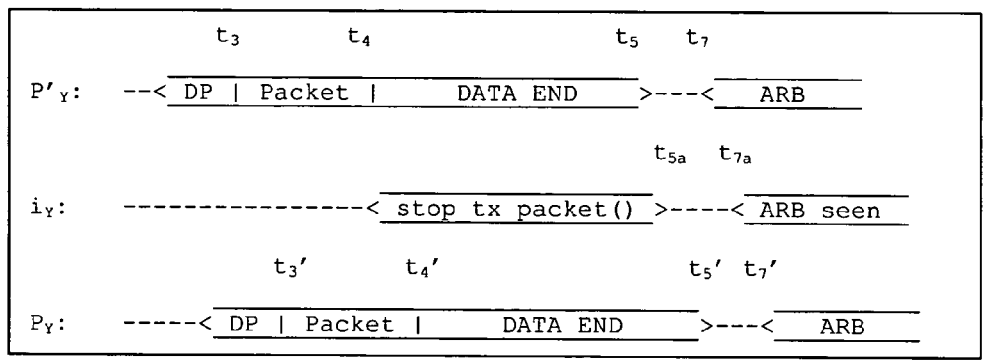
FIG. 6 illustrates an internal gap detection sequence, by showing the timing reference for relating the external gap detection times to the internal gap detection times.

For the maximum subaction_gap detection time at point $P'_Y$, the 1995 standard again only specifies the internal state machine timeout values. FIG. 6 provides the timing reference for relating the external gap detection times to the internal ones. The elaborated timing sequence is identical to the case for RESPONSE_TIME through point $t_5'$. The remaining sequence is:

T7  The arbitration indication launched by PHY X arrives at point $P'_Y$
T7a  The arbitration indication launched by PHY X arrives at point iY. $t_{7a}$ lags $t_7$ by an unspecified arbitration detection time, herein termed ARB_DETECTION_TIME The externally seen gap at point $P'_Y$ is given as $$\text{gap}^{P'Y} = t_7 - t_5 \quad (53)$$

The corresponding internal gap at point iY is $$\text{gap}^{iy} = t_{7a} - t_{5a} \quad (54)$$

Given that $$t_{7a} = t_7 + \text{ARB\_DETECTION\_TIME}_Y^{P'Y}$$

the external gap can be expressed as $$gap_Y^{P'_Y} = t_7 - t_5 \quad (56)$$

$$= t_{7a} - t_5 - \text{ARB\_DETECTION\_TIME}_Y^{P'_Y}$$

$$= t_{7a} - t_{5a} + t_{5a} - t_5 - \text{ARB\_DETECTION\_TIME}_Y^{P'_Y}$$

$$= gap^{i_Y} + t_{5a} - t_5 - \text{ARB\_DETECTION\_TIME}_Y^{P'_Y}$$

$$= gap^{i_Y} + \text{PHY\_DELAY}_n^{P'_n \to P_n} + \text{DE\_delta}^{[P_Y, P_{Y-1}]} + \text{PPM\_delta}^{[Y,Y-1]} - \text{transceiver\_delay}_Y^{P_Y} - \text{ARB\_DETECTION\_TIME}_Y^{P'_Y}$$

Consequently, $$\text{subaction\_gap}_Y^{P'_Y} = \text{subaction\_gap}^{j_Y} + \quad (57)$$
$$\text{PHY\_DELAY}_Y^{P'_Y \to P_Y} + \text{DE\_delta}^{[P_Y, P_{Y-1}]} + \text{PPM\_delta}^{[Y,Y-1]} - \text{transceiver\_delay}_Y^{P_Y} - \text{ARB\_DETECTION\_TIME}_Y^{P'_Y}$$

Substituting (52) and (57) into (46) yields $$\begin{bmatrix} \text{subaction\_gap}^{j_x} + \text{arb\_delay}^{j_x} - \\ \text{Data\_Arb\_Mismatch}^{[P_x \to P_Y]} - \\ \text{DE\_delta}^{[P_{Y-1}, P_X]} - \\ \text{PPM\_delta}^{[Y-1,X]} \end{bmatrix} > \begin{bmatrix} \text{subaction\_gap}^{j_x} + \text{PHY\_DELAY}_Y^{P'_Y \to P_Y} + \\ \text{DE\_delta}^{[P_Y, P_{Y-1}]} + \text{PPM\_delta}^{[Y-1,X]} - \\ \text{transceiver\_delay}_Y^{P_Y} - \text{ARB\_DETECTION\_TIME}_Y^{P'_Y} \end{bmatrix} \quad (58)$$

The inequality holds generally if $$[\text{subaction\_gap}^{j_x} + \text{arb\_delay}^{j_x}]_{\min} > \quad (59)$$
$$\begin{bmatrix} \text{subaction\_gap}^{j_x} + \text{PHY\_DELAY}_Y^{P'_Y \to P_Y} + \\ \text{DE\_delta}^{[P_Y, P_{Y-1}]} + \text{PPM\_delta}^{[Y-1,X]} + \\ \text{DE\_delta}^{[P_{Y-1}, P_X]} - \text{PPM\_delta}^{[Y-1,X]} + \\ \text{Data\_Arb\_Mismatch}^{[P_x \to P_Y]} - \\ \text{transceiver\_delay}_Y^{P_Y} - \text{ARB\_DETECTION\_TIME}_Y^{P'_Y} \end{bmatrix}_{\max}$$

Combining the DE_Delta and PPM_delta terms gives:

$$[\text{subaction\_gap}^{j_x} + \text{arb\_delay}^{j_x}]_{\min} > \quad (60)$$
$$\begin{bmatrix} \text{subaction\_gap}^{j_x} + \text{PHY\_DELAY}_Y^{P'_Y \to P_Y} + \\ \text{DE\_delta}^{[P_Y, P_X]} + \text{PPM\_delta}^{[Y,X]} + \\ \text{Data\_Arb\_Mismatch}^{[P_x \to P_Y]} - \\ \text{transceiver\_delay}_Y^{P_Y} - \text{ARB\_DETECTION\_TIME}_Y^{P'_Y} \end{bmatrix}_{\max}$$

By assuming
$$\text{DE\_delta}^{[P_Y, P_X]} + \text{PPM\_delta}^{[Y,X]} \leq \text{transceiver\_delay}_Y^{P_Y} + \text{ARB\_DETECTION\_TIME}_Y^{P'_Y} \quad (61)$$

the constraining inequality can be further simplified to give $$[\text{subaction\_gap}^{j_x} + \text{arb\_delay}^{j_x}]_{\min} > \quad (62)$$
$$\begin{bmatrix} \text{subaction\_gap}^{j_x} + \text{PHY\_DELAY}_{Y,\max}^{P'_Y \to P_Y} + \\ \text{Data\_Arb\_Mismatch}_{\max}^{[P_x \to P_Y]} \end{bmatrix}$$

where $$\text{subaction\_gap}_{\min}^{j_x} = \frac{27 + \text{gap\_count} \cdot 16}{\text{BASERATE}_{X,\max}} \quad (63)$$

$$\text{arb\_delay}_{\min}^{j_x} = \frac{\text{gap\_count} \cdot 4}{\text{BASERATE}_{X,\max}} \quad (64)$$

and $$\text{subaction\_gap}_{\max}^{i_y} = \frac{29 + \text{gap\_count} \cdot 16}{\text{BASERATE}_{Y,\min}} \quad (65)$$

Solving for gap count, $$\text{gap\_count} > \frac{\text{BASERATE}_{X,\max} \cdot \begin{bmatrix} \text{PHY\_DELAY}_{Y,\max}^{P'_Y \to P_Y} + \\ \text{Data\_Arb\_Mismatch}_{\max}^{[P_x \to P_Y]} \end{bmatrix} + 29 \cdot \frac{\text{BASERATE}_{X,\max}}{\text{BASERATE}_{Y,\min}} - 27}{20 - 16 \cdot \frac{\text{BASERATE}_{X,\max}}{\text{BASERATE}_{Y,\min}}} \quad (66)$$

Figure 7:
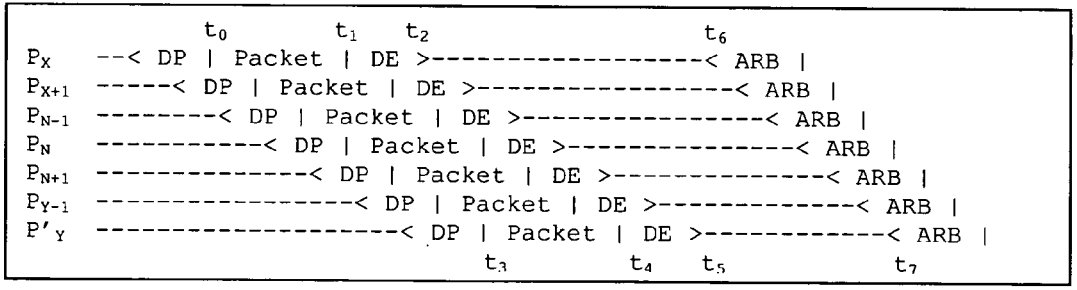
FIG. 7 illustrates consistent arbitration reset gap detection, in the case where PHY X originates an asynchronous packet, observes an arbitration reset gap, and begins to drive an arbitration indication.

For any given topology, the gap count must be set such that if an arbitration reset gap is observed following an asynchronous packet at one PHY, it is observed at all PHYs. The danger occurs when a subsequent arbitration indication is transmitted in the same direction as the previous data packet. Given that arbitration indications may propagate through intervening PHYs faster than data bits, gaps may be shortened as they are repeated. FIG. 7 illustrates the case in which PHY X originates an asynchronous packet, observes an arbitration reset gap, and begins to drive an arbitration indication.

For all topologies, the minimum idle time observed at point P'$_Y$ must always exceed the maximum arbitration reset gap detection time:

$$\text{Idle}_{\min}^{P'_Y} > \text{arb\_reset\_gap}_{\max}^{P'_Y} \quad (67)$$

The time events $t_0$ through $t_5$ are identical to the previous analyses. In this scenario, $t_6$ follows $t_2$ by the time it takes PHY X to time arb_reset_gap and arb_delay:

$$t_6 = t_2 + \text{arb\_reset\_gap}^{P_X} + \text{arb\_delay}^{P_X} = \quad (68)$$
$$t_0 + \frac{\text{packet\_length}}{\text{packet\_speed} \cdot \text{BASERATE}_X} +$$
$$\text{DATA\_END\_TIME}_X^{P_x} + \text{arb\_reset\_gap}^{P_X} + \text{arb\_delay}^{P_X}$$

The 1995 IEEE 1394 standard provides the timeouts used internally by the state machine. The externally observed timing requirements could differ (given possible mismatches in transceiver delay and state machines between the leading edge of IDLE and the leading edge of the subsequent arbitration indication). However, previous works have suggested any such delays could and should be well matched and that the external timing would follow the internal timing exactly. Consequently, $$\text{arb\_reset\_gap}^{P_X} + \text{arb\_delay}^{P_X} = \text{arb\_reset\_gap}^{i_X} + \text{arb\_delay}^{i_X} \tag{69}$$

T7 follows T6 by the time it takes the arbitration signal to propagate through the intervening PHYs and cables:

$$\begin{aligned} t_7 &= t_6 + \sum_{n=X+1}^{Y-1} \left( \text{cable\_delay}_n + \text{ARB\_RESPONSE\_DELAY}_n^{P'_n \to P_n} \right) + \\ &\quad \text{cable\_delay} - X \\ &= t_0 + \frac{\text{packet\_length}}{\text{packet\_speed} \cdot \text{BASERATE}_X} + \text{DATA\_END\_TIME}_X^{P_X} + \\ &\quad \text{arb\_reset\_gap}^{i_X} + \text{arb\_delay}^{i_X} + \\ &\quad \sum_{n=X+1}^{Y-1} \left( \text{cable\_delay}_n + \text{ARB\_RESPONSE\_DELAY}_n^{P'_n \to P_n} \right) + \\ &\quad \text{cable\_delay} - X \end{aligned} \tag{70}$$

Given $t_0$ through $t_7$ above, the Idle time seen at point $P'_Y$ is given as:

$$\begin{aligned} \text{Idle}^{P'_Y} &= t_7 - t_5 = \\ &\quad \text{arb\_reset\_gap}^{i_X} + \text{arb\_delay}^{i_X} - \text{Data\_Arb\_Mismatch}^{[P_X \to P_Y]} - \\ &\quad \text{DE\_delta}^{[P_{Y-1}, P_X]} - \text{PPM\_delta}^{[Y-1,X]} \end{aligned} \tag{71}$$

For the maximum arbitration_reset_gap detection time at point $P'_Y$, equation (56) gives:

$$\begin{aligned} \text{arb\_reset\_gap}^{P'_Y} &= \text{arb\_reset\_gap}^{i_Y} + \\ &\quad \text{PHY\_DELAY}_Y^{P'_Y \to P_Y} + \text{DE\_delta}^{[P_Y,P_{Y-1}]} + \text{PPM\_delta}^{[Y-1,X]} - \\ &\quad \text{transceiver\_delay}_Y^{P'_Y} - \text{ARB\_DETECTION\_TIME}_Y^{P'_Y} \end{aligned} \tag{72}$$

Substituting (71) and (72) into (67) yields $$\begin{bmatrix} \text{arb\_reset\_gap}^{i_X} + \text{arb\_delay}^{i_X} - \\ \text{Data\_Arb\_Mismatch}^{[P_X \to P_Y]} - \\ \text{DE\_delta}^{[P_{Y-1}, P_X]} - \\ \text{PPM\_delta}^{[Y-1,X]} \end{bmatrix} > \begin{bmatrix} \text{arb\_reset\_gap}^{i_Y} + \text{PHY\_DELAY}_Y^{P'_Y \to P_Y} + \\ \text{DE\_delta}^{[P_Y,P_{Y-1}]} + \text{PPM\_delta}^{[Y-1,X]} - \\ \text{transceiver\_delay}_Y^{P_Y} - \text{ARB\_DETECTION\_TIME}_Y^{P'_Y} \end{bmatrix} \tag{73}$$

The inequality holds generally if $$[\text{arb\_reset\_gap}^{i_X} + \text{arb\_delay}^{i_X}]_{\min} > \tag{74}$$

$$\begin{bmatrix} \text{arb\_reset\_gap}^{i_Y} + \text{PHY\_DELAY}_Y^{P'_Y \to P_Y} + \\ \text{DE\_delta}^{[P_Y,P_{Y-1}]} + \text{PPM\_delta}^{[Y,Y-1]} + \\ \text{DE\_delta}^{[P_{Y-1},P_X]} + \text{PPM\_delta}^{[Y-1,X]} + \\ \text{Data\_Arb\_Mismatch}^{[P_X \to P_Y]} - \\ \text{transceiver\_delay}_Y^{P'_Y} - \text{ARB\_DETECTION\_TIME}_Y^{P'_Y} \end{bmatrix}_{\max}$$

Combining the DE_Delta and PPM_delta terms gives:

$$[\text{arb\_reset\_gap}^{i_X} + \text{arb\_delay}^{i_X}]_{\min} > \tag{75}$$

$$\begin{bmatrix} \text{arb\_reset\_gap}^{i_Y} + \text{PHY\_DELAY}_Y^{P'_Y \to P_Y} + \\ \text{DE\_delta}^{[P_Y,P_X]} + \text{PPM\_delta}^{[Y,X]} + \\ \text{Data\_Arb\_Mismatch}^{[P_X \to P_Y]} - \\ \text{transceiver\_delay}_Y^{P'_Y} - \text{ARB\_DETECTION\_TIME}_Y^{P'_Y} \end{bmatrix}_{\max}$$

By requiring $$\text{DE\_delta}^{[P_Y,P_X]} + \text{PPM\_delta}^{[Y,X]} \leq \text{transceiver\_delay}_Y^{P_Y} + \text{ARB\_DETECTION\_TIME}_Y^{P'_Y} \tag{76}$$

the constraining inequality can be further simplified to give $$[\text{arb\_reset\_gap}^{i_X}_{\min} + \text{arb\_delay}^{i_X}_{\min}] > \tag{77}$$

$$\begin{bmatrix} \text{arb\_reset\_gap}^{i_Y}_{\max} + \text{PHY\_DELAY}_{Y,\max}^{P'_Y \to P_Y} + \\ \text{Data\_Arb\_Mismatch}_{\max}^{[P_X \to P_Y]} \end{bmatrix}$$

where $$\text{arb\_reset\_gap}^{i_X}_{\min} = \frac{51 + \text{gap\_count} \cdot 32}{\text{BASERATE}_{X,\max}} \tag{78}$$

$$\text{arb\_delay}^{i_X}_{\min} = \frac{\text{gap\_count} \cdot 4}{\text{BASERATE}_{X,\max}} \text{ and} \tag{79}$$

$$\text{arb\_reset\_gap}^{i_Y}_{\max} = \frac{53 + \text{gap\_count} \cdot 32}{\text{BASERATE}_{Y,\min}} \tag{80}$$

Solving for gap count, $$\text{gap\_count} > \frac{\text{BASERATE}_{X,\max} \cdot \begin{bmatrix} \text{PHY\_DELAY}_{Y,\max}^{P'_Y \to P_Y} + \\ \text{Data\_Arb\_Mismatch}_{\max}^{[P_X \to P_Y]} \end{bmatrix} + 53 \cdot \frac{\text{BASERATE}_{X,\max}}{\text{BASERATE}_{Y,\min}} - 51}{36 - 32 \cdot \frac{\text{BASERATE}_{X,\max}}{\text{BASERATE}_{Y,\min}}} \tag{81}$$

Equations (31), (45), (66) and (81) place a lower bound on gap count. Let:

$$gap\_count_A = \frac{BASERATE_{X,max} \cdot \begin{bmatrix} Round\_Trip\_Delay_{max}^{[P_X OP_Y]} + \\ RESPONSE\_TIME_{Y,max}^{P_Y} + \\ PHY\_DELAY_{X,max}^{P_X} \end{bmatrix} - 27}{16} \quad (82)$$

$$gap\_count_B = \frac{BASERATE_{X,max} \cdot \begin{bmatrix} Round\_Trip\_Delay_{max}^{[P_X OP_Y]} + \\ RESPONSE\_TIME_{Y,max}^{P_Y} - \\ MIN\_IDLE\_TIME_Y + \\ PHY\_DELAY_{X,max}^{P_X} \end{bmatrix} + 29 \cdot \frac{BASERATE_{X,max}}{BASERATE_{Y,min}} - 51}{32 - 20 \cdot \frac{BASERATE_{X,max}}{BASERATE_{Y,min}}} \quad (83)$$

$$gap\_count_C = \frac{BASERATE_{X,max} \cdot \begin{bmatrix} Data\_Arb\_Mismatch_{max}^{[P_X \to P_Y]} + \\ PHY\_DELAY_{Y,max}^{P_Y \to P_Y} \end{bmatrix} + 29 \cdot \frac{BASERATE_{X,max}}{BASERATE_{Y,min}} - 27}{20 - 16 \cdot \frac{BASERATE_{X,max}}{BASERATE_{Y,min}}} \quad (84)$$

$$gap\_count_D = \frac{BASERATE_{X,max} \cdot \begin{bmatrix} Data\_Arb\_Mismatch_{max}^{[P_X \to P_Y]} + \\ PHY\_DELAY_{Y,max}^{P_Y \to P_Y} \end{bmatrix} + 53 \cdot \frac{BASERATE_{X,max}}{BASERATE_{Y,min}} - 51}{36 - 32 \cdot \frac{BASERATE_{X,max}}{BASERATE_{Y,min}}} \quad (85)$$

Given the ratio of maximum to minimum BASERATE is always >1 and that MIN_IDLE_TIME is ~40 ns, it is clear that:

$$gap\_count_B > gap\_count_A \quad (86)$$

and $$gap\_count_D > gap\_count_C \quad (87)$$

To select an appropriate gap count for a given topology, both $gap\_count_B$ and $gap\_count_D$ must be calculated, rounded up to the next integer, and the maximum of the two results selected.

For IEEE1394-1995 style topologies (assumed to be limited to 4.5 m cables and a worst case PHY_DELAY of 144 ns), a table can be constructed to provide the gap count setting as a function of hops. In constructing such a table, the constant values in Table 2 are assumed.

TABLE 2

PHY Timing Constants

| Parameter | Minimum | Maximum |
|---|---|---|
| ARB_RESPONSE_DELAY[1] | PHY_DELAY(max) − 60 ns | PHY_DELAY(max) |
| BASERATE | 98.294 mbps | 98.314 mbps |
| cable_delay | | 22.725 ns |
| MIN_IDLE_TIME | 40 ns | |
| PHY_DELAY | | 144 ns |
| RESPONSE_TIME | | PHY_DELAY + 100 ns |

The resulting gap count versus Cable Hops can then be calculated:

TABLE 3

Gap Count as a function of hops

| Hops | Gap Count |
|---|---|
| 1 | 5 |
| 2 | 7 |
| 3 | 8 |
| 4 | 10 |
| 5 | 13 |
| 6 | 16 |
| 7 | 18 |
| 8 | 21 |
| 9 | 24 |
| 10 | 26 |
| 11 | 29 |
| 12 | 32 |
| 13 | 35 |
| 14 | 37 |
| 15 | 40 |
| 16 | 43 |
| 17 | 46 |
| 18 | 48 |
| 19 | 51 |
| 20 | 54 |
| 21 | 57 |
| 22 | 59 |
| 23 | 62 |

Pinging provides an effective way to set an optimal gap count for topologies with initially unspecified or unknown PHY or cable delays. Specifically, pinging allows determination of an instantaneous Round_Trip_Delay between two given points. Once the worst case Round_Trip Delay has been determined via pinging, $gap\_count_b$ and $gap\_count_d$ can be calculated and the appropriate gap count selected.

The Jitter value specified in the PHY register map was introduced to help relate instantaneous measurements of ROUND_TRIP_DELAY to the maximum possible ROUND_TRIP_DELAY between two points. Specifically, the outbound PHY_DELAY and return ARB_RESPONSE_DELAY measured between a given ordered pair of ports on a PHY (say $P_c$ out to and back from $P_d$) can be related to the maximum outbound PHY_DELAY and return ARB_RESPONSE_DELAY between any and all ordered pairs of ports (referenced as $P_a$ & $P_b$) on the same PHY:

$$0 \leq \begin{bmatrix} \frac{PHY\_DELAY_{n,max}^{P_a \to P_b} + ARB\_RESPONSE\_DELAY_{n,max}^{P_b \to P_a}}{2} - \\ \frac{PHY\_DELAY_{n,meas}^{P_c \to P_d} + ARB\_RESPONSE\_DELAY_{n,meas}^{P_d \to P_c}}{2} \end{bmatrix} \leq Jitter_n \quad (88)$$

Noting that a measured value can never exceed a maximum value between order ports, the following corollary relating two independent measurements can be proven for any and all combination of ordered ports:

$$\left| \frac{PHY\_DELAY_{n,meas_j}^{P_a \to P_b} + ARB\_RESPONSE\_DELAY_{n,meas_j}^{P_b \to P_a}}{2} - \frac{PHY\_DELAY_{n,meas_2}^{P_c \to P_d} + ARB\_RESPONSE\_DELAY_{n,meas_2}^{P_d \to P_c}}{2} \right| \leq \quad (89)$$

$$Jitter_n$$

In order for a bus manager to calculate ordered leaf-to-leaf delays via a series of ping requests launched from the bus manager, a number of ROUND_TRIP_DELAY relationships will be required and are derived below.

$$Round\_Trip\_Delay_{max}^{[P_X OP_Y]}$$

Using the definition of Round_Trip_Delay first provided in equation (12) as guidance, the roundtrip delay between Nodes X and Y from the perspective of Node X can be written as:

$$Round\_Trip\_Delay_{max}^{[P_X OP_Y]} = \quad (90)$$

$$\sum_{n=X+1}^{Y-1} \left( \begin{array}{l} 2 \cdot cable\_delay_n + PHY\_DELAY_{n,max}^{P'_n \to P_n} + \\ ARB\_RESPONSE\_DELAY_{n,max}^{P_n \to P'_n} + \end{array} \right) +$$

$$2 \cdot cable\_delay_X$$

From equation (88), the maximum PHY_DELAY and ARB_RESPONSE_DELAY between an ordered pair of ports can be bounded by the measured delays plus the overall jitter sum yielding:

$$Round\_Trip\_Delay_{max}^{[P_X OP_Y]} \leq \quad (91)$$

$$\sum_{n=X+1}^{Y-1} \left( \begin{array}{l} 2 \cdot cable\_delay_n + PHY\_DELAY_{n,meas_j}^{P'_n \to P_n} + \\ ARB\_RESPONSE\_DELAY_{n,meas_j}^{P_n \to P'_n} + \\ 2 \cdot Jitter_n \end{array} \right) +$$

$$2 \cdot cable\_delay_X$$

Comparison to the definition of Round_Trip_Delay then allows $$Round\_Trip\_Delay_{max}^{[P_X OP_Y]} \leq \quad (92)$$

$$Round\_Trip\_Delay_{meas_j}^{[P_X OP_Y]} + \sum_{n=X+1}^{Y-1} 2 \cdot Jitter_n$$

$$Round\_Trip\_Delay_{max}^{[P_Y OP_X]}$$

Using the definition of Round_Trip_Delay first provided in equation (12) as guidance, the roundtrip delay between Nodes X and Y from the perspective of Node Y can be written as:

$$Round\_Trip\_Delay_{max}^{[P_Y OP_X]} = \quad (93)$$

$$\sum_{n=X+1}^{Y-1} \left( \begin{array}{l} 2 \cdot cable\_delay_n + PHY\_DELAY_{n,max}^{P_n \to P'_n} + \\ ARB\_RESPONSE\_DELAY_{n,max}^{P'_n \to P_n} \end{array} \right) +$$

$$2 \cdot cable\_delay_X$$

From equation (88), the maximum PHY_DELAY and ARB_RESPONSE_DELAY between an ordered pair of ports can be related to the measured delays observed in the reverse direction:

$$\left( \begin{array}{l} PHY\_DELAY_{n,max}^{P_n \to P'_n} + \\ ARB\_RESPONSE\_DELAY_{n,max}^{P'_n \to P_n} \end{array} \right) \leq \quad (94)$$

$$2 \cdot Jitter_n + \left( \begin{array}{l} PHY\_DELAY_{n,meas_j}^{P'_n \to P_n} + \\ ARB\_RESPONSE\_DELAY_{n,meas_j}^{P_n \to P'_n} \end{array} \right)$$

allowing the maximum round trip between Nodes X and Y to be rewritten as:

$$Round\_Trip\_Delay_{max}^{[P_Y OP_X]} \leq \quad (95)$$

$$\sum_{n=X+1}^{Y-1} \left( \begin{array}{l} 2 \cdot cable\_delay_n + PHY\_DELAY_{n,meas_j}^{P'_n \to P_n} + \\ ARB\_RESPONSE\_DELAY_{n,meas_j}^{P_n \to P'_n} + \\ 2 \cdot Jitter_n \end{array} \right) +$$

$$2 \cdot cable\_delay_X$$

Comparison to the definition of Round_Trip_Delay then allows $$Round\_Trip\_Delay_{max}^{[P_Y OP_X]} \leq \quad (96)$$

$$Round\_Trip\_Delay_{meas_j}^{[P_X OP_Y]} + \sum_{n=X+1}^{Y-1} 2 \cdot Jitter_n$$

$$Round\_Trip\_Delay_{max}^{[P_N OP_Y]}$$

Using the definition of Round_Trip_Delay first provided in equation (12) as guidance, the roundtrip delay between Nodes N and Y from the perspective of Node N can be written as:

$$Round\_Trip\_Delay_{max}^{[P_N OP_Y]} = \quad (97)$$

$$\sum_{n=N+1}^{Y-1} \left( \begin{array}{l} 2 \cdot cable\_delay_n + PHY\_DELAY_{n,max}^{P'_n \to P_n} + \\ ARB\_RESPONSE\_DELAY_{n,max}^{P_n \to P'_n} \end{array} \right) + 2 \cdot cable\_delay_N$$

From equation (88), the maximum PHY_DELAY and ARB_RESPONSE_DELAY between an ordered pair of ports can be bounded by the measured delays plus the overall jitter sum yielding:

$$\text{Round\_Trip\_Delay}_{\max}^{[P_N OP_Y]} \leq \qquad (98)$$

$$\sum_{n=N+1}^{Y-1} \begin{pmatrix} 2 \cdot \text{cable\_delay}_n + \text{PHY\_DELAY}_{n,\text{meas}_1}^{P'_n \to P_n} + \\ \text{ARB\_RESPONSE\_DELAY}_{n,\text{meas}_1}^{P_n \to P'_n} + \\ 2 \cdot \text{Jitter}_n \end{pmatrix} +$$

$$2 \cdot \text{cable\_delay}_N$$

Introducing offsetting terms to the right side:

$$\text{Round\_Trip\_Delay}_{\max}^{[P_N OP_Y]} \leq \qquad (99)$$

$$\sum_{n=X+1}^{Y-1} \begin{pmatrix} 2 \cdot \text{cable\_delay}_n + \text{PHY\_DELAY}_{n,\text{meas}_1}^{P'_n \to P_n} + \\ \text{ARB\_RESPONSE\_DELAY}_{n,\text{meas}_1}^{P_n \to P'_n} + \\ 2 \cdot \text{Jitter}_n \end{pmatrix} +$$

$$2 \cdot \text{cable\_delay}_X -$$

$$\sum_{n=X+1}^{N-1} \begin{pmatrix} 2 \cdot \text{cable\_delay}_n + \text{PHY\_DELAY}_{n,\text{meas}_1}^{P'_n \to P_n} + \\ \text{ARB\_RESPONSE\_DELAY}_{n,\text{meas}_1}^{P_n \to P'_n} + \\ 2 \cdot \text{Jitter}_n \end{pmatrix} -$$

$$2 \cdot \text{cable\_delay}_X - \text{PHY\_DELAY}_{N,\text{meas}_1}^{P'_N \to P_N} -$$

$$\text{ARB\_RESPONSE\_DELAY}_{N,\text{meas}_1}^{P_N \to P'_N} - 2 \cdot \text{Jitter}_N$$

Equations (89) and the fact that measured delays are at no smaller than minimum delays allow simplification to:

$$\text{Round\_Trip\_Delay}_{\max}^{[P_N OP_Y]} \leq \qquad (100)$$

$$\sum_{n=X+1}^{Y-1} \begin{pmatrix} 2 \cdot \text{cable\_delay}_n + \text{PHY\_DELAY}_{n,\text{meas}_1}^{P'_n \to P_n} + \\ \text{ARB\_RESPONSE\_DELAY}_{n,\text{meas}_1}^{P_n \to P'_n} + \\ 2 \cdot \text{Jitter}_n \end{pmatrix} +$$

$$2 \cdot \text{cable\_delay}_X -$$

$$\sum_{n=X+1}^{N-1} \begin{pmatrix} 2 \cdot \text{cable\_delay}_n + \text{PHY\_DELAY}_{n,\text{meas}_2}^{P'_n \to P_n} + \\ \text{ARB\_RESPONSE\_DELAY}_{n,\text{meas}_2}^{P_n \to P'_n} \end{pmatrix} -$$

$$2 \cdot \text{cable\_delay}_X - \text{PHY\_DELAY}_{N,\min}^{P'_N \to P_N} -$$

$$\text{ARB\_RESPONSE\_DELAY}_{N,\min}^{P_N \to P'_N} - 2 \cdot \text{Jitter}_N$$

Comparison to the definition of Round_Trip_Delay then allows $$\text{Round\_Trip\_Delay}_{\max}^{[P_N OP_Y]} \leq \qquad (101)$$

$$\text{Round\_Trip\_Delay}_{\text{meas}_1}^{[P_X OP_Y]} + \sum_{n=X+1}^{Y-1} 2 \cdot \text{Jitter}_n -$$

$$\text{Round\_Trip\_Delay}_{\text{meas}_2}^{[P_X OP_N]} - \text{PHY\_DELAY}_{N,\min}^{P'_N \to P_N} -$$

$$\text{ARB\_RESPONSE\_DELAY}_{N,\min}^{P_N \to P'_N} - 2 \cdot \text{Jitter}_N$$

$$\text{Round\_Trip\_Delay}_{\max}^{[P_Y OP_N]}$$

Using the definition of Round_Trip_Delay first provided in equation (12) as guidance, the roundtrip delay between Nodes N and Y from the perspective of Node Y can be written as:

$$\text{Round\_Trip\_Delay}_{\max}^{[P_Y OP_N]} = \qquad (102)$$

$$\sum_{n=N+1}^{Y-1} \begin{pmatrix} 2 \cdot \text{cable\_delay}_n + \text{PHY\_DELAY}_{n,\max}^{P_n \to P'_n} + \\ \text{ARB\_RESPONSE\_DELAY}_{n,\max}^{P'_n \to P_n} \end{pmatrix} +$$

$$2 \cdot \text{cable\_delay}_N$$

From equation (88), the maximum PHY_DELAY and ARB_RESPONSE_DELAY between an ordered pair of ports can be related to the measured delays observed in the reverse direction:

$$\begin{pmatrix} \text{PHY\_DELAY}_{n,\max}^{P_n \to P'_n} + \\ \text{ARB\_RESPONSE\_DELAY}_{n,\max}^{P'_n \to P_n} \end{pmatrix} \leq \qquad (103)$$

$$2 \cdot \text{Jitter}_n + \begin{pmatrix} \text{PHY\_DELAY}_{n,\text{meas}_1}^{P'_n \to P_n} + \\ \text{ARB\_RESPONSE\_DELAY}_{n,\text{meas}_1}^{P_n \to P'_n} \end{pmatrix}$$

allowing the maximum round trip between Nodes N and Y to be rewritten as:

$$\text{Round\_Trip\_Delay}_{\max}^{[P_Y OP_N]} \leq \qquad (104)$$

$$\sum_{n=N+1}^{Y-1} \begin{pmatrix} 2 \cdot \text{cable\_delay}_n + \text{PHY\_DELAY}_{n,\text{meas}_1}^{P'_n \to P_n} + \\ \text{ARB\_RESPONSE\_DELAY}_{n,\text{meas}_1}^{P_n \to P'_n} + \\ 2 \cdot \text{Jitter}_n \end{pmatrix} +$$

$$2 \cdot \text{cable\_delay}_N$$

Introducing offsetting terms to the right side:

$$\text{Round\_Trip\_Delay}_{\max}^{[P_Y OP_N]} \leq \qquad (105)$$

$$\sum_{n=X+1}^{Y-1} \begin{pmatrix} 2 \cdot \text{cable\_delay}_n + \text{PHY\_DELAY}_{n,\text{meas}_1}^{P'_n \to P_n} + \\ \text{ARB\_RESPONSE\_DELAY}_{n,\text{meas}_1}^{P_n \to P'_n} + \\ 2 \cdot \text{Jitter}_n \end{pmatrix} +$$

$$2 \cdot \text{cable\_delay}_X -$$

$$\sum_{n=X+1}^{N-1} \begin{pmatrix} 2 \cdot \text{cable\_delay}_n + \text{PHY\_DELAY}_{n,\text{meas}_1}^{P'_n \to P_n} + \\ \text{ARB\_RESPONSE\_DELAY}_{n,\text{meas}_1}^{P_n \to P'_n} + \\ 2 \cdot \text{Jitter}_n \end{pmatrix} -$$

$$2 \cdot \text{cable\_delay}_X - \text{PHY\_DELAY}_{N,\text{meas}_1}^{P'_N \to P_N} -$$

$$\text{ARB\_RESPONSE\_DELAY}_{N,\text{meas}_1}^{P_N \to P'_N} - 2 \cdot \text{Jitter}_N$$

Equations (89) and the fact that measured delays are at no smaller than minimum delays allow simplification to:

$$\text{Round\_Trip\_Delay}_{\max}^{[P_Y OP_N]} \leq \qquad (106)$$

$$\sum_{n=X+1}^{Y-1} \begin{pmatrix} 2 \cdot \text{cable\_delay}_n + \text{PHY\_DELAY}_{n,meas_1}^{P_n' \rightarrow P_n} + \\ \text{ARB\_RESPONSE\_DELAY}_{n,meas_1}^{P_n \rightarrow P_n'} + \\ 2 \cdot \text{Jitter}_n \end{pmatrix} +$$

$$2 \cdot \text{cable\_delay}_X -$$

$$\sum_{n=X+1}^{N-1} \begin{pmatrix} 2 \cdot \text{cable\_delay}_n + \text{PHY\_DELAY}_{n,meas_1}^{P_n' \rightarrow P_n} + \\ \text{ARB\_RESPONSE\_DELAY}_{n,meas_2}^{P_n \rightarrow P_n'} + \end{pmatrix} -$$

$$2 \cdot \text{cable\_delay}_X - \text{PHY\_DELAY}_{N,\min}^{P_N' \rightarrow P_N} -$$

$$\text{ARB\_RESPONSE\_DELAY}_{N,\min}^{P_N \rightarrow P_N'} - 2 \cdot \text{Jitter}_N$$

Comparison to the definition of Round_Trip_Delay then allows $$\text{Round\_Trip\_Delay}_{\max}^{[P_Y OP_N]} \leq \qquad (107)$$

$$\text{Round\_Trip\_Delay}_{meas_1}^{[P_X OP_Y]} + \sum_{n=X+1}^{Y-1} 2 \cdot \text{Jitter}_n -$$

$$\text{Round\_Trip\_delay}_{meas_2}^{[P_X OP_N]} - \text{PHY\_DELAY}_{N,\min}^{P_N' \rightarrow P_N} -$$

$$\text{ARB\_RESPONSE\_DELAY}_{N,\min}^{P_N \rightarrow P_N'} - 2 \cdot \text{Jitter}_N$$

Figure 8:
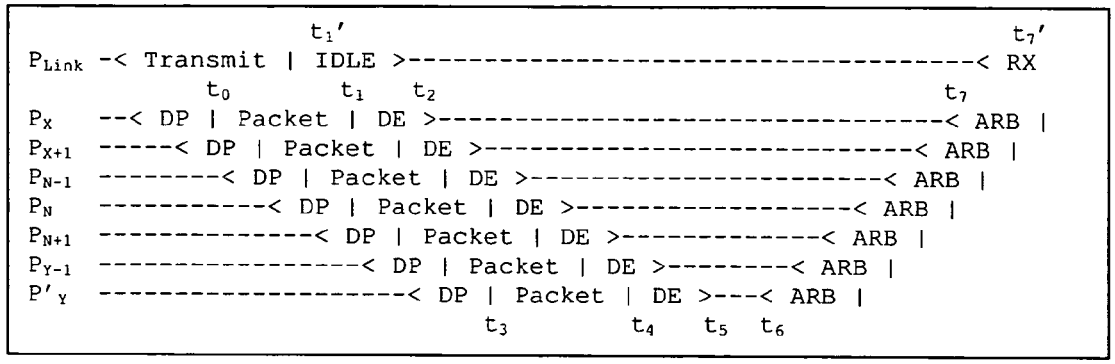
FIG. 8 illustrates a ping subaction issued by the link in Node X and directed to Node Y.

PHY pinging provides a low level mechanism to directly measure round trip delays between two nodes by timing link initiated subactions. However, pinging does introduce some uncertainty in the measured delay. Any gap count algorithm which employs PHY pinging must compensate for such uncertainty. FIG. 8 depicts a ping subaction issued by the link in Node X and directed to Node Y.

The timing reference points $t_1$ through $t_7$ are identical to those used in the previous gap count derivations. Additionally:

| | |
|---|---|
| $t_1'$ | Coincident with the rising SCLK edge in which the PHY first samples IDLE after a link transmission. $t_1'$ leads $t_1$ by LINK_TO_BUS_DELAY |
| $t_7'$ | Coincident with the rising SCLK edge in which the PHY is driving the first RECEIVE indication to the link. (The PHY presumably drove RECEIVE off of the previous clock transition.) $t_7'$ lags $t_7$ by BUS_TO_LINK_DELAY |

The ping time measured by the link (in SCLK cycles) is then given by:

$$\text{Ping\_Time}_{meas}^{[P_X OP_Y]} = t_7' - t_1' \qquad (108)$$

$$= \text{BUS\_TO\_LINK\_DELAY}_{X,meas} + t_7 - t_1 +$$

$$\text{LINK\_TO\_BUS\_DELAY}_{X,meas}$$

$$= \text{BUS\_TO\_LINK\_DELAY}_{X,meas} +$$

$$\text{LINK\_TO\_BUS\_DELAY}_{X,meas} + t_0 +$$

$$\sum_{n=X+1}^{Y-1} \begin{pmatrix} 2 \cdot \text{cable\_delay}_n + \\ \text{PHY\_DELAY}_{n,meas}^{P_n' \rightarrow P_n} + \\ \text{ARB\_RESPONSE\_DELAY}_{n,meas}^{P_n \rightarrow P_n'} \end{pmatrix} +$$

$$2 \cdot \text{cable\_delay}_X + \frac{\text{packet\_length}}{\text{packet\_speed} \cdot \text{BASERATE}_{Y-1}} +$$

$$\text{DATA\_END\_TIME}_{Y-1,meas}^{P_{Y-1}} +$$

$$\text{RESPONSE\_TIME}_{Y,meas}^{P_Y} -$$

$$t_0 - \frac{\text{packet\_length}}{\text{packet\_speed} \cdot \text{BASERATE}_X}$$

$$= \text{BUS\_TO\_LINK\_DELAY}_{X,meas} +$$

$$\text{LINK\_TO\_BUS\_DELAY}_{X,meas} +$$

$$\text{Round\_Trip\_Delay}_{meas}^{[P_X OP_Y]} +$$

$$\text{PPM\_delta}^{[Y-1,X]} +$$

$$\text{DATA\_END\_TIME}_{Y-1,meas}^{P_{Y-1}} +$$

$$\text{RESPONSE\_TIME}_{Y,meas}^{P_Y}$$

Solving for the measured Round_Trip_Delay gives:

$$\text{Round\_Trip\_Delay}_{meas}^{[P_X OP_Y]} = \qquad (109)$$

$$\text{Ping\_Time}_{meas}^{[P_X OP_Y]} - \text{BUS\_TO\_LINK\_DELAY}_{X,meas} -$$

$$\text{LINK\_TO\_BUS\_DELAY}_{X,meas} - \text{PPM\_delta}^{[Y-1,X]} -$$

$$\text{DATA\_END\_TIME}_{Y-1,meas}^{P_{Y-1}} - \text{RESPONSE\_TIME}_{Y,meas}^{P_Y}$$

Remembering that RESPONSE_TIME (min or max) absorbs PPM_delta, an upper and lower bound can be defined for Round_Trip_Delay:

$$\text{Round\_Trip\_Delay}_{Ping,\max}^{[P_X OP_Y]} = \qquad (110)$$

$$\text{Ping\_Time}_{meas}^{[P_X OP_Y]} - \text{BUS\_TO\_LINK\_DELAY}_{X,\min} -$$

$$\text{LINK\_TO\_BUS\_DELAY}_{X,\min} -$$

$$\text{DATA\_END\_TIME}_{Y-1,\min}^{P_{Y-1}} - \text{RESPONSE\_TIME}_{Y,\min}^{P_Y}$$

and $\text{Round\_Trip\_Delay}_{Ping,\min}^{[P_X OP_Y]} = \qquad (111)$ $$\text{Ping\_Time}_{meas}^{[P_X OP_Y]} - \text{BUS\_TO\_LINK\_DELAY}_{X,\max} -$$

$$\text{LINK\_TO\_BUS\_DELAY}_{X,\max} -$$

$$\text{DATA\_END\_TIME}_{Y-1,\max}^{P_{Y-1}} - \text{RESPONSE\_TIME}_{Y,\max}^{P_Y}$$

such that $$\text{Round\_Trip\_Delay}_{Ping,\min}^{[P_X OP_Y]} \leq \qquad (112)$$

$$\text{Round\_Trip\_Delay}_{meas}^{[P_X OP_Y]} \leq \text{Round\_Trip\_Delay}_{Ping,\max}^{[P_X OP_Y]}$$

Using the Round_Trip_Delay properties and the Ping_Time relationships, the maximum Round_Trip_Delay between two given leaf nodes can be bounded for any possible topology.

Figure 9:
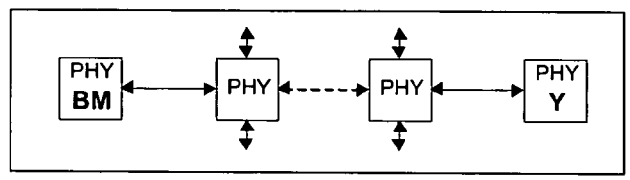
FIG. 9 illustrates a Bus Manager Leaf to Leaf topology.

The simplest and most accurate Round_Trip_Delay determination is afforded when the Bus Manager is one of the leaf nodes in question as shown in FIG. 9.

From (92), $$\text{Round\_Trip\_Delay}_{\max}^{[P_{BM}OP_Y]} \leq \qquad (113)$$

$$\text{Round\_Trip\_Delay}_{meas_1}^{[P_{BM}OP_Y]} + \sum_{n}^{(BM,Y)} 2 \cdot Jitter_n$$

And from (112), $$\text{Round\_Trip\_Delay}_{\max}^{[P_{BM}OP_Y]} \leq \qquad (114)$$

$$\text{Round\_Trip\_Delay}_{Ping,\max}^{[P_{BM}OP_Y]} + \sum_{n}^{(BM,Y)} 2 \cdot Jitter_n$$

Likewise, the reverse path is also bounded:

$$\text{Round\_Trip\_Delay}_{\max}^{[P_Y OP_{BM}]} \leq \qquad (115)$$

$$\text{Round\_Trip\_Delay}_{Ping,\max}^{[P_{BM}OP_Y]} + \sum_{n}^{(BM,Y)} 2 \cdot Jitter_n$$

Figure 10:
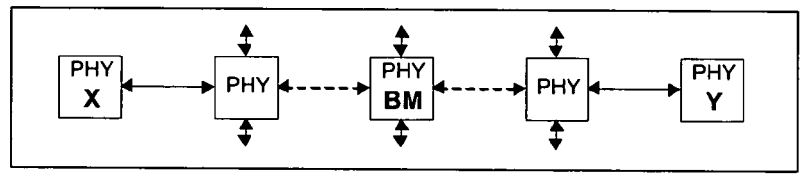
FIG. 10 illustrates a topology where the bus manager is not a leaf but is part of the connecting path between the two leaves.

The second topology to consider is when the bus manager is not a leaf but is part of the connecting path between the two leaves as illustrated in FIG. 10.

Expressing the max delay piecewise, $$\text{Round\_Trip\_Delay}_{\max}^{[P_X OP_Y]} = \qquad (116)$$

$$\text{Round\_Trip\_Delay}_{\max}^{[P_X OP_{BM}]} + \text{Round\_Trip\_Delay}_{\max}^{[P_{BM}OP_Y]} +$$

$$\text{PHY\_DELAY}_{BM,\max}^{P'_{BM} \to P_{BM}} + \text{ARB\_RESPONSE\_DELAY}_{BM,\max}^{P_{BM} \to P'_{BM}}$$

Equations (92) and (96) allow:

$$\text{Round\_Trip\_Delay}_{\max}^{[P_X OP_Y]} \leq \qquad (117)$$

$$\text{Round\_Trip\_Delay}_{meas}^{[P_{BM}OP_X]} + \sum_{n}^{(BM,X)} 2 \cdot Jitter_n +$$

$$\text{Round\_Trip\_Delay}_{meas}^{[P_{BM}OP_Y]} + \sum_{n}^{(BM,Y)} 2 \cdot Jitter_n +$$

$$\text{PHY\_DELAY}_{BM,\max}^{P'_{BM} \to P_{BM}} + \text{ARB\_RESPONSE\_DELAY}_{BM,\max}^{P_{BM} \to P'_{BM}}$$

And from (112), $$\text{Round\_Trip\_Delay}_{\max}^{[P_X OP_Y]} \leq \qquad (118)$$

$$\text{Round\_Trip\_Delay}_{Ping,\max}^{[P_{BM}OP_X]} + \sum_{n}^{(BM,X)} 2 \cdot Jitter_n +$$

$$\text{PHY\_DELAY}_{BM,\max}^{P'_{BM} \to P_{BM}} + \text{ARB\_RESPONSE\_DELAY}_{BM,\max}^{P_{BM} \to P'_{BM}} + \sum_{n}^{(BM,Y)}$$

Likewise, the reverse path is also bounded:

$$\text{Round\_Trip\_Delay}_{\max}^{[P_Y OP_X]} \leq \qquad (119)$$

$$\text{Round\_Trip\_Delay}_{Ping,\max}^{[P_{BM}OP_X]} + \sum_{n}^{(BM,X)} 2 \cdot Jitter_n +$$

$$\text{Round\_Trip\_Delay}_{Ping,\max}^{[P_{BM}OP_Y]} + \sum_{n}^{(BM,Y)} 2 \cdot Jitter_n +$$

$$\text{PHY\_DELAY}_{BM,\max}^{P_{BM} \to P'_{BM}} + \text{ARB\_RESPONSE\_DELAY}_{BM,\max}^{P'_{BM} \to P_{BM}}$$

Figure 11:
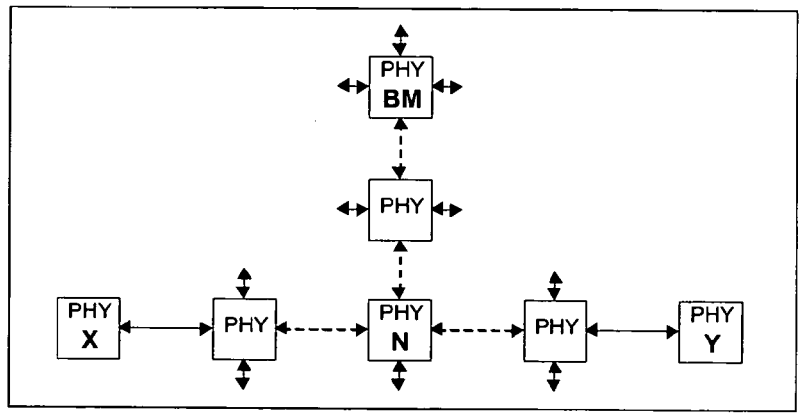
FIG. 11 illustrates a topology where the bus manager is not a leaf but is not part of the connecting path between the two leaves.

The final topology to consider is when the bus manager is not a leaf but is not part of the connecting path between the two leaves as illustrated in FIG. 11.

Expressing the max delay piecewise, $$\text{Round\_Trip\_Delay}_{\max}^{[P_X OP_Y]} = \qquad (120)$$

$$\text{Round\_Trip\_Delay}_{\max}^{[P_X OP_N]} + \text{Round\_Trip\_Delay}_{\max}^{[P_N OP_Y]} +$$

$$\text{PHY\_DELAY}_{N,\max}^{P'_N \to P_N} + \text{ARB\_RESPONSE\_DELAY}_{N,\max}^{P_N \to P'_N}$$

Equations (107) and (101) allow:

$$\text{Round\_Trip\_Delay}_{\max}^{[P_X OP_Y]} \leq \qquad (121)$$

$$\left( \begin{array}{l} \text{Round\_Trip\_Delay}_{meas_1}^{[P_{BM}OP_X]} + \sum_{n}^{(BM,X)} 2 \cdot Jitter_n - \\ \text{Round\_Trip\_Delay}_{meas_2}^{[P_{BM}OP_N]} - \text{PHY\_DELAY}_{N,\min}^{P_{BM} \to P'_N} - \\ \text{ARB\_RESPONSE\_DELAY}_{N,\min}^{P'_N \to P_N^{BM}} - 2 \cdot Jitter_N \end{array} \right) +$$

$$\left( \begin{array}{l} \text{Round\_Trip\_Delay}_{meas_1}^{[P_{BM}OP_Y]} + \sum_{n}^{(BM,Y)} 2 \cdot Jitter_n - \\ \text{Round\_Trip\_Delay}_{meas_2}^{[P_{BM}OP_N]} - \text{PHY\_DELAY}_{N,\min}^{P_{BM} \to P_N} - \\ \text{ARB\_RESPONSE\_DELAY}_{N,\min}^{P_N \to P_N^{BM}} - 2 \cdot Jitter_N \end{array} \right) +$$

$$\text{PHY\_DELAY}_{N,\max}^{P'_N \to P_N} + \text{ARB\_RESPONSE\_DELAY}_{N,\max}^{P_N \to P'_N}$$

And from (112), $$\text{Round\_Trip\_Delay}_{\max}^{[P_X OP_Y]} \leq \qquad (122)$$

$$\left( \begin{array}{l} \text{Round\_Trip\_Delay}_{Ping,\max}^{[P_{BM}OP_X]} + \sum_{n}^{(BM,X)} 2 \cdot Jitter_n + \\ \text{Round\_Trip\_Delay}_{Ping,\max}^{[P_{BM}OP_Y]} + \sum_{n}^{(BM,Y)} 2 \cdot Jitter_n + \\ \text{PHY\_DELAY}_{N,\max}^{P'_N \to P_N} + \text{ARB\_RESPONSE\_DELAY}_{N,\max}^{P_N \to P'_N} \end{array} \right) -$$

$$\left( \begin{array}{l} 2 \cdot \text{Round\_Trip\_Delay}_{Ping,\min}^{[P_{BM}OP_N]} + 4 \cdot Jitter_N + \\ \text{PHY\_DELAY}_{N,\min}^{P_{BM} \to P'_N} + \text{ARB\_RESPONSE\_DELAY}_{N,\min}^{P'_N \to P_N^{BM}} + \\ \text{PHY\_DELAY}_{N,\min}^{P_{BM} \to P_N} + \text{ARB\_RESPONSE\_DELAY}_{N,\min}^{P_N \to P_N^{BM}} \end{array} \right)$$

ARB_RESPONSE_DELAY is a difficult parameter to characterize. Proper PHY operation requires that arb signals propagate at least as fast as the data bits, otherwise the arbitration indications could shorten as they are repeated through a network. This fact places a bound on the maximum ARB_RESPONSE_DELAY: ARB_RESPONSE_DELAY between two ports at a particular instant must always be less than or equal to the data repeat delay at the very same instant. Although the distinction is subtle, this is not the same as saying the maximum ARB_RESPONSE_DELAY is PHY_DELAY. (PHY_DELAY only applies to the first bit of a packet and is known to have some jitter from one repeat operation to the next. Consequently, requiring ARB_RESPONSE_DELAY<=PHY_DELAY doesn't force ARB_RESPONSE_DELAY to track the instantaneous PHY_ DELAY nor does it allow ARB_RESPONSE_DELAY to track the data repeat time for the last bit of a packet which may actually exceed PHY_DELAY due to PPM drift.) Finally, the table approach to calculating gap_counta and gap_countb rely on ARB_RESPONSE_DELAY always being bounded by the maximum PHY_DELAY when determining the Round_Trip_Delay.

The minimum ARB_RESPONSE_DELAY is only of significance when calculating Data_Arb_Mismatch as required by gap_countc and gap_countd. Ideally, Data_Arb_Mismatch should be a constant regardless of PHY_DELAY so that neither gap_countc nor gap_countd will begin to dominate the gap_count setting as PHY_DELAY increases. Consequently, the minimum ARB_RESPONSE_DELAY should track the instantaneous PHY_DELAY with some offset for margin. Simply specifying the min value as a function of PHY_DELAY is ambiguous, however, since PHY_DELAY can be easily confused with the max DELAY reported in the register map. (For example, with DELAY at 144 ns, it would be easy to assume a min of PHY_DELAY −60 ns would be equivalent to 84 ns. But if the worst case first bit repeat delay was only 100 ns, arb signals repeating with a delay of 40 ns ought to be considered within spec even though the delay is <84 ns.)

Consequently, specifying an upper and a lower bound for ARB_RESPONSE_DELAY is best done in the standard with words rather than values. The minimum and maximum values for ARB_RESPONSE_DELAY include that between all ordered pairs of ports, the PHY shall repeat arbitration line states at least as fast as clocked data, but not more than 60 ns faster than clocked data.

A better approach is to replace ARB_RESPONSE_DELAY with the parameter DELAY_MISMATCH which is defined in the comment column as "Between all ordered pairs of ports, the instantaneous repeat delay for data less the instantaneous repeat delay for arbitration line states." Then, the minimum would be given as 0 ns and the maximum would be 60 ns.

For a table based calculation of Round_Trip_Delay, either approach above allows the use of PHY_DELAY(max) for ARB_RESPONSE_DELAY. Since Round_Trip_Delay considers the arbitration repeat delay in the direction opposite to the original packet flow, the return arbitration indication of interest is known to arrive at the receive port when the PHY is idle (all caught up with nothing to repeat). At that point, the instantaneous PHY_DELAY is the same as the first data bit repeat delay which is bounded by PHY_DELAY(max). Since ARB_RESPONSE_DELAY is always bounded by the instantaneous PHY_DELAY, it to is bounded by PHY_DELAY(max) at the point the arbitration indication first arrives.

The minimum bound on PHY_DELAY is used by the bus manager when determining the round_trip_delay between leaf nodes that are not separated by the bus manager. The more precise the minimum bound, the more accurate the pinging calculation can be. Ideally then, the bound may want to scale with increasing PHY_DELAY. Alternatively, the lower bound could be calculated by examining the Delay field in the register map: if zero, the lower bound is assumed to be the fixed value specified (60 ns currently). If non-zero, the lower bound could then be determined by subtracting the jitter field (converted to ns) from the delay field (converted to ns).

The "Jitter" field was introduced to aid in selection of gap_count via pinging by describing the uncertainty found in any empirical measurement of Round_Trip_Delay. Since Round_Trip_Delay encompasses an "outbound" PHY_DELAY and a "return" ARB_RESPONSE_DELAY, the jitter term should capture uncertainty in both. The needs of pinging can be met with the following description for jitter: Upper bound of the mean average of the worst case data repeat jitter (max/min variance) and the worst case arbitration repeat jitter (max/min variance), expressed as 2*(jitter+ 1)/BASE_RATE.

Note that from the discussion on minimum PHY_DELAY, it may be desirable to require that if the delay field is non-zero, then the slowest first data bit repeat delay can be calculated by subtracting the jitter value from the delay value.

What is claimed is:

1. A device for use in a first node of a serial bus, the device comprising:
    a first module adapted to ping a second node;
    a second module adapted to receive a ping response from the second node;
    a third module adapted to calculate a maximum round trip delay between a first PHY associated with the first node and a second PHY associated with the second node based at least in part upon a jitter value, and further based at least in part on the ping response sent to the second module; and
    a fourth module adapted to send a configuration packet to all PHYs on the serial bus, the configuration packet containing a gap count, the gap count derived from the maximum round trip delay between the first PHY and the second PHY;
    wherein at least one of said first PHY and second PHY comprises a first pair of ports and a second pair of ports and the jitter value is defined as being greater than or equal to the absolute value of a total quantity, the total quantity defined as the difference between a first quantity and a second quantity; and
    wherein the first quantity comprises the sum of a first sub-quantity and a second sub-quantity, the first sub-quantity consisting of a PHY delay between the first ordered pair of ports divided by two, the second sub-quantity consisting of an arbitration response delay between the first ordered pair of ports divided by two.

2. The device of claim 1, wherein the second quantity comprises the sum of a third subquantity and a fourth subquantity, the third subquantity consisting of a PHY delay between the second ordered pair of ports divided by two, and the fourth subquantity consisting of an arbitration response delay between the second ordered pair of ports divided by two.

3. The device of claim 1, wherein the response comprises a self-identification packet.

4. The device of claim 1, wherein all PHYs of the high-speed serial bus comprise a subaction gap detection time that is greater than a maximum idle value that can occur within a subaction.

5. The device of claim 1, wherein all PHYs of the high-speed serial bus comprise an arbitration reset gap timeout value that is greater than the largest subaction gap that can occur over the high-speed serial bus.

6. A method of optimizing communication over a high-speed serial bus by minimizing the delay between packets transmitted over the bus, the method comprising:
   sending a ping from a first node to a second node;
   sending a response from the second node to the first node after receiving the ping;
   calculating a maximum round trip delay between a first PHY of the first node and a second PHY of the second node based at least in part upon a jitter, and further based at least in part upon the response sent to the first node;
   sending via a bus manager a configuration packet to all PHYs connected on the bus, the configuration packet containing a minimum gap_count parameter value, the minimum gap_count parameter value derived from the maximum round trip delay between the first PHY and the second PHY; and
   sending via all PHYs connected on the packets over the bus, using the minimum gap_count parameter value as a delay between packets;
   wherein at least one of said first PHY and second PHY comprises a first pair of ports and a second pair of ports, wherein the jitter is defined as being greater than or equal to the absolute value of a total quantity, the total quantity defined as the difference between a first quantity and a second quantity; and
   wherein the first quantity comprises the sum of a first subquantity and a second subquantity, the first subquantity consisting of a PHY delay between the first ordered pair of ports divided by two, the second subquantity consisting of an arbitration response delay between the first ordered pair of ports divided by two.

7. The method of claim 6, wherein the second quantity comprises the sum of a third subquantity and a fourth subquantity, the third subquantity consisting of a PHY delay between the second ordered pair of ports divided by two, and the fourth subquantity consisting of an arbitration response delay between the second ordered pair of ports divided by two.

8. The method of claim 6, further comprising preserving an ack/iso gap between packets, wherein a first PHY sent a most recently-sent packet and a second PHY is responding to the first PHY.

9. The method of claim 8, wherein the second PHY is adapted to respond with an ack packet.

10. The method of claim 8, wherein the second PHY is adapted to respond with an isochronous arbitration packet.

11. The method of claim 6, wherein the first PHY sends an isochronous packet, observes a sub action gap, and initiates an arbitration indication.

12. The method of claim 6, wherein the first PHY sends an asynchronous packet, observes an arbitration reset gap, and initiates an arbitration indication.

13. The method of claim 6, wherein calculating the round trip delay comprises executing a ping command at a link layer on said first node directed at a link layer on said second node.

14. The method of claim 13, wherein calculating the round trip delay comprises calculating a round trip delay from a first link on the first node and a second link on the second node.

15. The method of claim 6, wherein the second PHY has a subaction gap timeout value that is greater than an IDLE value that can occur within a subaction and an isochronous interval on the high-speed serial bus.

16. The method of claim 6, wherein all PHYs of the high-speed serial bus comprise a subaction gap detection time that is greater than a maximum idle value that can occur within a subaction.

17. The method of claim 6, wherein all PHYs of the high-speed serial bus comprise an arbitration reset gap timeout value that is greater than the largest subaction gap that can occur over the high-speed serial bus.

18. The method of claim 6, wherein the response comprises a self-ID packet.

19. A computer-readable medium containing instructions which, when executed by a processor, minimize the delay between packets transmitted over a high-speed serial bus, by performing the method comprising:
   sending a ping from a first node to a second node;
   sending a response from the second node to the first node after receiving the ping;
   calculating a maximum round trip delay between a first PHY of the first node and a second PHY of the second node based at least in part upon a jitter, and further based at least in part upon the response sent to the first node;
   sending via a bus manager a configuration packet to all PHYs connected on the bus, the configuration packet containing a minimum gap_count parameter value, the minimum gap_count parameter value derived from the maximum round trip delay between the first PHY and the second PHY; and
   sending via all PHYs connected on the packets over the buss using the minimum gap_count parameter value as a delay between packets;
   wherein at least one of said first PHY and second PHY comprises a first pair of ports and a second pair of ports, wherein the jitter is defined as being greater than or equal to the absolute value of a total quantity, the total quantity defined as the difference between a first quantity and a second quantity; and
   wherein the first quantity comprises the sum of a first subquantity and a second subquantity, the first subquantity consisting of a PHY delay between the first ordered pair of ports divided by two, the second subquantity consisting of an arbitration response delay between the first ordered pair of ports divided by two.

20. The method of claim 19, wherein the second quantity comprises the sum of a third subquantity and a fourth subquantity, the third subquantity consisting of a PHY delay between the second ordered pair of ports divided by two, and the fourth subquantity consisting of an arbitration response delay between the second ordered pair of ports divided by two.

21. The method of claim 19, further comprising preserving an ack/iso gap between packets, wherein a first PHY sent a most recently-sent packet and a second PHY is responding to the first PHY.

22. The method of claim 21, wherein the second PHY is adapted to respond with an ack packet.

23. The method of claim 21, wherein the second PHY is adapted to respond with an isochronous arbitration packet.

24. The method of claim 19, wherein the first PHY sends an isochronous packet, observes a sub action gap, and initiates an arbitration indication.

25. The method of claim 19, wherein the first PHY sends an asynchronous packet, observes an arbitration reset gap, and initiates an arbitration indication.

26. The method of claim 19, wherein calculating the round trip delay comprises executing a ping command at a link layer on said first node directed at a link layer on said second node.

27. The method of claim 26, wherein calculating the round trip delay comprises calculating a round trip delay from a first link on the first node and a second link on the second node.

28. The method of claim 19, wherein the second PHY has a subaction gap timeout value that is greater than an IDLE value that can occur within a subaction and an isochronous interval on the high-speed serial bus.

29. The method of claim 19, wherein all PHYs of the high-speed serial bus comprise a subaction gap detection time that is greater than a maximum idle value that can occur within a subaction.

30. The method of claim 19, wherein all PHYs of the high-speed serial bus comprise an arbitration reset gap timeout value that is greater than the largest subaction gap that can occur over the high-speed serial bus.

31. The method of claim 19, wherein the response comprises a self-ID packet.

32. A device for use in a first node of a serial bus, the device comprising:
means for pinging a second node;
means for receiving a ping response from the second node;
means for calculating a maximum round trip delay between a first PHY associated with the first node and a second PHY associated with the second node based at least in part upon a jitter value, and further based at least in part on the ping response sent to the second module; and
means for sending a configuration packet to all PHYs on the serial bus, the configuration packet containing a gap count, the gap count derived from the maximum round trip delay between the first PHY and the second PHY;
wherein at least one of said first PHY and second PHY comprises a first pair of ports and a second pair of ports and the jitter value is defined as being greater than or equal to the absolute value of a total quantity, the total quantity defined as the difference between a first quantity and a second quantity; and
wherein the first quantity comprises the sum of a first sub-quantity and a second sub-quantity, the first sub-quantity consisting of a PHY delay between the first ordered pair of ports divided by two, the second sub-quantity consisting of an arbitration response delay between the first ordered pair of ports divided by two.

33. A device for use in a first node of a serial bus, the device comprising:
a first module adapted to send a first signal to a second node, said first signal adapted to elicit a response from said second node;
a second module adapted to calculate a maximum round trip delay between the first node and the second node based at least in part upon a jitter value, and further based at least in part on the response elicited from the second node; and
a third module adapted to send a packet to all nodes on the serial bus, the packet containing a gap count, the gap count derived from the maximum round trip delay between the first node and the second node;
wherein at least one of said first node and said second node comprises a first pair of ports and the jitter value is defined as being greater than or equal to the absolute value of a total quantity, the total quantity defined as the difference between a first quantity and a second quantity; and
wherein the first quantity comprises the sum of a first sub-quantity and a second sub-quantity, the first sub-quantity consisting of a delay between the first pair of ports divided by two, the second sub-quantity consisting of an arbitration response delay between the first pair of ports divided by two.

34. The device of claim 33, wherein at least one of said first node and said second node further comprises a second pair of ports, wherein the second quantity comprises the sum of a third subquantity and a fourth subquantity, the third subquantity consisting of a delay between the second pair of ports divided by two, and the fourth subquantity consisting of an arbitration response delay between the second pair of ports divided by two.

35. The device of claim 33, wherein the response comprises a self-identification packet.

36. A method of optimizing communication over a serial bus, the method comprising:
sending a first message from a first node to a second node;
sending a response from the second node to the first node after receiving the first message;
calculating a maximum round trip delay between the first node and the second node based at least in part upon a jitter, and further based at least in part upon the response sent to the first node;
sending a packet to all nodes connected on the bus, the packet containing a minimum gap count parameter value derived from the maximum round trip delay between the first node and the second node; and
sending via all nodes connected on the bus the minimum gap count parameter value as a delay between packets;
wherein at least one of said first node and second node comprises a first pair of ports, and wherein the jitter is defined as being greater than or equal to the absolute value of the difference between a first quantity and a second quantity; and
wherein the first quantity comprises the sum of a first subquantity and a second subquantity, the first subquantity comprising a PHY delay related to the first pair of ports, the second subquantity comprising an arbitration response delay related to the first pair of ports.

37. The method of claim 36, wherein at least one of said first node and said second node further comprises a second pair of ports, wherein the second quantity comprises the sum of a third subquantity and a fourth subquantity, the third subquantity comprising a PHY delay related to the second pair of ports, and the fourth subquantity comprising an arbitration response delay related to the second pair of ports.

38. The method of claim 36, wherein calculating the round trip delay comprises executing a ping command at a link layer on said first node directed at a link layer on said second node.

39. The method of claim 38, wherein calculating the round trip delay comprises calculating a round trip delay from a first link on the first node and a second link on the second node.

40. The method of claim 36, wherein the second node has a subaction gap timeout value that is greater than an idle value that can occur within a subaction and an isochronous interval on the serial bus.

41. The method of claim 36, wherein all nodes of the serial bus comprise a subaction gap detection time that is greater than a maximum idle value that can occur within a subaction.

42. The method of claim 36, wherein all nodes of the high-speed serial bus comprise an arbitration reset gap timeout value that is greater than the largest subaction gap that can occur over the serial bus.

43. The method of claim 36, wherein the response comprises a self-identification packet.

* * * * *